United States Patent
Wang et al.

(10) Patent No.: US 10,516,574 B2
(45) Date of Patent: *Dec. 24, 2019

(54) METHOD AND TOOL FOR DIAGNOSING LOGICAL NETWORKS

(71) Applicant: Nicira, Inc., Palo Alto, CA (US)

(72) Inventors: Xin Wang, Beijing (CN); Jianjun Shen, Redwood City, CA (US); Yusheng Wang, Beijing (CN); Hua Wang, Beijing (CN); Donghai Han, Beijing (CN)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/276,601

(22) Filed: Feb. 14, 2019

(65) Prior Publication Data
US 2019/0190780 A1   Jun. 20, 2019

Related U.S. Application Data

(63) Continuation of application No. 15/012,782, filed on Feb. 1, 2016, now Pat. No. 10,225,149.

(60) Provisional application No. 62/267,396, filed on Dec. 15, 2015.

(51) Int. Cl.
*H04L 12/26* (2006.01)
*H04L 12/24* (2006.01)

(52) U.S. Cl.
CPC .......... *H04L 41/0853* (2013.01); *H04L 41/12* (2013.01); *H04L 41/20* (2013.01); *H04L 43/065* (2013.01)

(58) Field of Classification Search
CPC ..... H04L 41/0853; H04L 41/20; H04L 41/12; H04L 43/065

USPC ......................................................... 709/224
See application file for complete search history.

(56) References Cited

U.S. PATENT DOCUMENTS

| | | |
|---|---|---|
| 6,393,486 B1 | 5/2002 | Pelavin et al. |
| 7,111,053 B1 | 9/2006 | Black et al. |
| 7,266,595 B1 | 9/2007 | Black et al. |
| 7,299,277 B1 | 11/2007 | Moran et al. |
| 7,349,960 B1 | 3/2008 | Pothier et al. |
| 2002/0112044 A1 | 8/2002 | Hessmer et al. |
| 2002/0116485 A1 | 8/2002 | Black et al. |
| 2002/0161555 A1 | 10/2002 | Deb et al. |
| 2003/0046390 A1 | 3/2003 | Ball et al. |
| 2004/0213247 A1 | 10/2004 | Seki et al. |

(Continued)

FOREIGN PATENT DOCUMENTS

WO   2017160395 A1   9/2017

*Primary Examiner* — David R Lazaro
*Assistant Examiner* — Berhanu Shitayewoldetadik
(74) *Attorney, Agent, or Firm* — Adeli LLP

(57) ABSTRACT

Some embodiments provide a method for diagnosing a logical network that includes several logical forwarding elements (LFEs) that logically connects a number of data compute nodes (DCNs) to each other. The method identifies a set of LFEs that logically connects a first DCN of the several DCNs to a second DCN. The method also identifies a transport node that couples to the first DCN and implements the set of LFEs. The method then, for each LFE in the set of LFEs (i) receives a first state of the LFE from the transport node, (ii) compares the first state of the LFE with a second state of the LFE that is received from a controller of the LFE, and (iii) reports the LFE as a problematic LFE along with the transport node and the controller of the LFE when the first and second states of the LFE do not match.

20 Claims, 14 Drawing Sheets

(56) References Cited

U.S. PATENT DOCUMENTS

| | | |
|---|---|---|
| 2005/0091361 A1 | 4/2005 | Bernstein et al. |
| 2005/0169185 A1 | 8/2005 | Qiu et al. |
| 2005/0198247 A1 | 9/2005 | Perry et al. |
| 2006/0041660 A1 | 2/2006 | Bishop et al. |
| 2006/0215564 A1 | 9/2006 | Breitgand et al. |
| 2006/0253566 A1 | 11/2006 | Stassinopoulos et al. |
| 2006/0291387 A1 | 12/2006 | Kimura et al. |
| 2010/0138919 A1 | 6/2010 | Peng et al. |
| 2010/0172453 A1 | 7/2010 | Cankaya et al. |
| 2012/0120964 A1 | 5/2012 | Koponen et al. |
| 2013/0018947 A1 | 1/2013 | Archer et al. |
| 2013/0044636 A1 | 2/2013 | Koponen et al. |
| 2013/0060940 A1 | 3/2013 | Koponen et al. |
| 2014/0029451 A1 | 1/2014 | Nguyen |
| 2014/0189443 A1 | 7/2014 | Xu et al. |
| 2014/0301391 A1 | 10/2014 | Krishnan et al. |
| 2015/0009797 A1 | 1/2015 | Koponen et al. |
| 2015/0016287 A1 | 1/2015 | Ganichev et al. |
| 2015/0063360 A1 | 3/2015 | Thakkar et al. |
| 2015/0103661 A1 | 4/2015 | Shen et al. |
| 2015/0263946 A1 | 9/2015 | Tubaltsev et al. |
| 2015/0312326 A1 | 10/2015 | Archer et al. |
| 2016/0057014 A1 | 2/2016 | Thakkar et al. |
| 2016/0112269 A1 | 4/2016 | Singh et al. |
| 2016/0224659 A1 | 8/2016 | Robichaud |
| 2017/0171055 A1 | 6/2017 | Wang et al. |
| 2017/0264483 A1 | 9/2017 | Lambeth et al. |
| 2017/0264489 A1 | 9/2017 | Lambeth et al. |

METHOD AND TOOL FOR DIAGNOSING LOGICAL NETWORKS

CLAIM OF BENEFIT TO PRIOR APPLICATIONS

This application is a continuation application of U.S. patent application Ser. No. 15/012,782, filed Feb. 1, 2016, now published as U.S. Patent Publication 2017/0171055. U.S. patent application Ser. No. 15/012,782 claims the benefit of U.S. Provisional Application 62/267,396, filed Dec. 15, 2015. U.S. application Ser. No. 15/012,782 and 62/267,396 are incorporated herein by reference.

BACKGROUND

In a physical network, network functions and services are defined by network standard protocols and implemented by physical network devices. Network device vendors provide handy tools for diagnosing the network devices. When a network issue occurs, a user (e.g., a network administrator) can diagnose the network according to the standard protocols and runtime network topology using diagnosis tools provided by the device vendors. In a distributed virtual network (i.e., a logical network), however, network functions and services are implemented by logical forwarding elements (LFEs). Unlike the physical networks, the logical network topology cannot be used directly to diagnose network issues. This is because an LFE (e.g., a logical switch, a logical router, etc.) spans several different physical nodes and as such, the source of the network issue could be any one of the different physical nodes across which, the LFE spans (i.e., the physical nodes on which, the LFE is implemented).

BRIEF SUMMARY

Some embodiments provide a novel diagnostic method and tool for diagnosing a distributed virtual network (i.e., a logical network) and reporting any identified network issues. The method of some embodiments receives a request to diagnose a network issue between two or more data compute nodes (DCNs). The method identifies one or more logical paths between each pair of DCNs based on a logical network topology between the DCNs. Each logical path, in some embodiments, includes one or more logical forwarding elements (LFEs) that each spans (i.e., implemented on) a set of managed forwarding elements (MFEs). Each LFE (or one or more logical ports of the LFE) on a logical path may also receive a logical service (e.g., from a logical middlebox such as a logical firewall, a logical WAN optimizer, etc.) that also spans the set of MFEs. Each MFE (also referred to as a transport node), in some embodiments, is a managed software forwarding element that operates on a host machine or a gateway, or a managed hardware forwarding element (e.g., a third-party Top of Rack (TOR) switch).

After identifying the LFEs, the method of some embodiments receives a discovered state of each LFE (e.g., runtime forwarding data for a logical L2 switch or a logical L3 router, etc.) from an MFE that implements the LFE. The method also receives a translated state of the LFE (e.g., runtime forwarding data for the same logical L2 or L3 forwarding element) from a master controller that controls the data communication of the LFE on the MFE. When the discovered state data does not match the translated state data of the LFE, the method of some embodiments reports the LFE as a problematic LFE along with the MFE that implements the LFE and the master controller of the LFE. In some embodiments, the method also reports the machine that executes the software MFE (e.g., a host machine, a gateway machine, etc.) or the machine that includes the hardware MFE (e.g., a rack that includes a third-party TOR switch) on which the problematic LFE is implemented. As will be discussed further below, the method also reports a master manager of the problematic LFE in some embodiments.

A logical network, in some embodiments, includes a set of LFEs (e.g., logical L2 and L3 forwarding elements) that logically connects several different DCNs (e.g., of a tenant) that run on different host machines (e.g., of a hosting system) to each other and to other logical and/or physical networks. In some embodiments, a central management plane (CMP) cluster (e.g., a master manager computer in the CMP cluster) generates configuration data (e.g., based on data received from a user) that defines the logical network. In addition to the CMP cluster, some embodiments provide a central control plane (CCP) cluster that controls the network data communication between the different DCNs of the logical network. The CMP cluster includes one or more central managers, while the CCP cluster includes one or more central controllers. Each manager or controller, in some embodiments, can be a physical computing device (e.g., a server, a computer, etc.), a DCN (e.g., a VM, a container, etc.), or a software instance (e.g., process) operating on a physical computing device or DCN.

The CMP cluster of some embodiments pushes the configuration data to the CCP cluster (e.g., to a master controller of the logical network in the CCP cluster) and the transport nodes. The configuration data, which is called the desired state of the logical network in some embodiments, is pushed to the CCP cluster through the management plane (MP) channels. The configuration data received and stored in the master controller and transport nodes is called the realized state of the logical network in some embodiments. The CMP cluster also receives runtime data (e.g., for updating the configuration data) from the CCP cluster and the transport nodes through the MP channels.

Typical configuration data, in some embodiments, includes data that defines the location of DCNs (e.g., the location of VMs on host machines), data that defines connection topology between the DCNs as well as the locations of LFEs in the topology, data that defines middlebox services, which are applied to the LFEs (e.g., distributed firewall policies), etc. Typical runtime data, in some embodiments, includes layer 2 control plane tables such as virtual tunnel endpoint (VTEP) tables, media access control (MAC) tables, address resolution protocol (ARP) tables; layer 3 routing tables such as routing information base (RIB) tables, forwarding information base (FIB) tables; statistics data collected from transport nodes; etc.

The CCP cluster of some embodiments exchanges runtime data with the transport nodes (i.e., MFEs) in order to control the network traffic exchange between the different transport nodes that implement the LFEs. The CCP cluster exchanges the runtime data with the transport nodes through control plane (CP) channels. In some embodiments, each transport node discovers the runtime state of the set of LFEs that the transport node implements and pushes the discovered state to the CCP cluster (e.g., to the master controller in the CCP cluster) through a CP channel. The master controller then shares the discovered state the master controller receives of each transport node that implements the set of LFEs with other transport nodes that implements the LFEs. The discovered state of an LFE that is stored in the CCP cluster and shared with other transport nodes is called the translated (or shared) state of the LFE.

The shared state stored in the master controller is used to control the logical network data exchange between the transport nodes. For example, a particular transport node sets up tunnels (also referred to as data plane (DP) channels) for an LFE between the particular transport node and other transport nodes that implement the LFE. The tunnels that are used to exchange packets between the particular transport node and other transport nodes are established based on the discovered state of the particular transport node and the translated state (which covers the discovered state of every transport node that implements the LFE) that is stored in the CCP cluster.

In some embodiments, the diagnostic tool identifies and reports one or more LFEs as problematic LFEs when the diagnostic tool determines that the desired state of the LFEs that is stored in the master manager is not consistent (1) with the realized state of the LFEs stored in the CCP cluster, and/or (2) with the realized state of the LFEs stored in any of the transport nodes (that implements the LFEs). The diagnostic tool of some embodiments also identifies and reports the LFEs as having network issues when some form of inconsistency is determined to exist between the translated state of the LFEs stored in the master controller of the LFEs and the discovered state of the LFEs stored in the transport nodes that implement the LFEs.

The diagnostic tool of some embodiments diagnoses each logical path between each pair of endpoints (e.g., a pair of DCNs) bidirectionally. That is, the diagnostic tool of some such embodiments diagnoses a logical path from a source endpoint (e.g., a source virtual machine) to a destination endpoint (e.g., a destination virtual machine) and reports all potentially problematic LFEs (e.g., to a diagnosis requestor such as a network administrator). The diagnostic tool also diagnoses the logical path from the destination endpoint to the source endpoint and reports the problematic LFEs.

In some embodiments, the diagnostic tool identifies every LFE on the logical path as well as the logical services that each LFE receives based on the configuration data (i.e., the desired state) stored in a master manager (which indicates the topology of the logical network) of the logical network. The diagnostic tool of some embodiments identifies the physical span of each LFE based on the configuration data received from a master manager (i.e., the desired state) of the LFE and the runtime data received from a master controller (i.e., the translated state) of the LFE.

The diagnostic tool, in some embodiments in which the entire packet forwarding processing is performed at the first hop (i.e., a source MFE), identifies the source MFE that is connected to the source DCN (e.g., executing on a source host machine) and a destination MFE that is connected to the destination DCN (e.g., executing on a destination host machine). The diagnostic tool then, starting from the first LFE on the logical path to the last LFE, receives the discovered state and realized state of each LFE (as well as the different states of any logical service that the LFE receives) from the source MFE that implements the LFE. The diagnostic tool compares the realized state to the desired state of the LFE that is stored in the master manager of the LFE. The diagnostic tool also compares the discovered state to the translated state of the LFE that is stored in the master controller of the LFE.

In some embodiments, the diagnostic tool also analyses the different states of the last LFE (as well as any logical service that the last LFE receives) that are stored in the destination MFE. In other words, the different states of every LFE (and the states of logical services received by the LFE) are received from the source MFE, which executes on the source host machine in some embodiments. Additionally, in some such embodiments, the different states of the last LFE that is logically connected to the destination DCN (and the states of logical services corresponding to the last LFE) are received from the destination MFE, which executes on the destination host machine. In some embodiments, the logical port of the first LFE that is associated with a physical port of the source DCN and the logical port of the last LFE that is associated with a physical port of the destination DCN are also analyzed at the source and destination MFEs, respectively.

After finishing the analysis of the different states of the LFEs on the source MFE, the diagnostic tool of some embodiments starts analyzing the LFEs on the logical patch from the destination MFE to the source MFE in the same manner. That is, starting from the last LFE on the logical path to the first LFE, the tool receives the discovered state and realized state of each LFE (as well as any logical service that the LFE receives) from the destination MFE, which implements the LFEs. In some embodiments, the diagnostic tool also analyses the different states of the first LFE that is stored in the source MFE, which implements the first LFE.

In some embodiments, the diagnostic tool also receives and analyzes the different states of other logical network entities (LNEs) that are placed on the logical path between a pair of DCNs. Such analysis, in some embodiments, includes diagnosing the different states of the pair of DCNs, the physical ports of the DCNs (e.g., virtual network interface controllers (VNICs) of the DCNs) that connect the DCNs to their corresponding MFEs, and the tunnel endpoints (e.g., VTEPs) that are implemented by the MFEs in order to establish tunnels (e.g., VXLAN tunnel, STT tunnel, Geneve tunnel, etc.) between the source and destination MFEs.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
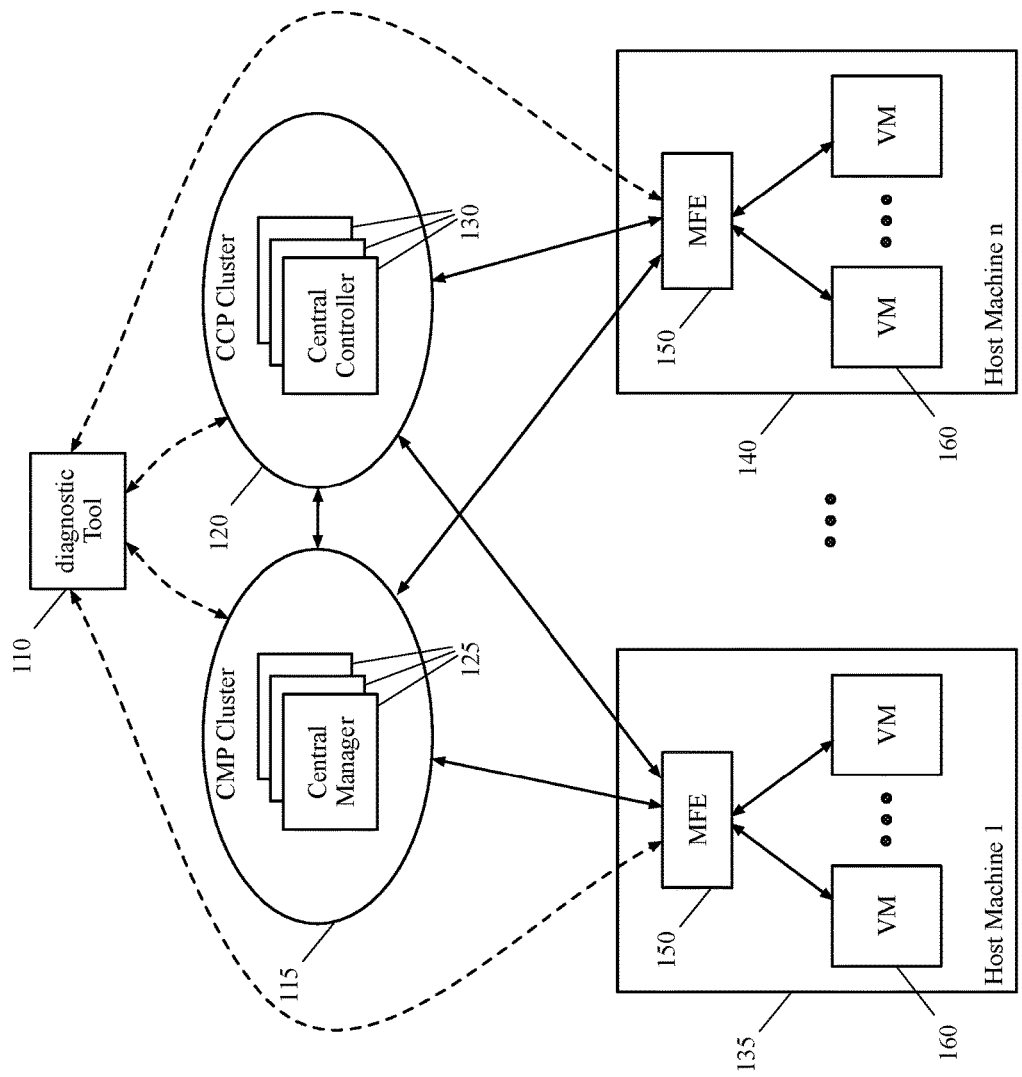
FIG. 1 illustrates a diagnostic tool of some embodiments that diagnoses a logical network and reports any logical network issue related to a logical network entity.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel diagnostic method and tool for diagnosing a distributed virtual network (i.e., a logical network) and reporting any identified network issues. The method of some embodiments receives a request to diagnose a network issue between two or more data compute nodes (DCNs). The method identifies one or more logical paths between each pair of DCNs based on a logical network topology between the DCNs. Each logical path, in some embodiments, includes one or more logical forwarding elements (LFEs) that each spans (i.e., implemented on) a set of managed forwarding elements (MFEs). Each LFE (or one or more logical ports of the LFE) on a logical path may also receive one or more logical services from one or more logical middleboxes (e.g., logical firewall, logical WAN optimizer, etc.) that also span the set of MFEs. Each MFE (also referred to as a transport node), in some embodiments, is a software MFE that operates on a host machine or a gateway, or a hardware MFE (e.g., a third-party Top of Rack (TOR) switch).

In some embodiments, the method receives a discovered state of each LFE (e.g., runtime forwarding data for a logical L2 switch or a logical L3 router, etc.) from an MFE that implements the LFE. The method also receives a translated state of the LFE (e.g., runtime forwarding data for the same logical L2 or L3 forwarding element) from a master controller that controls the data communication of the LFE on the MFE. When the discovered state data does not match the translated state data of the LFE, the method of some embodiments reports the LFE as a problematic LFE along with the MFE that implements the LFE and the master controller of the LFE. In some embodiments, the method also reports the machine that executes the software MFE (e.g., a host machine, a gateway machine, etc.) or the machine that includes the hardware MFE (e.g., a rack that includes a third-party TOR switch) on which the problematic LFE is implemented. As will be discussed further below, the method also reports a master manager of the MFE (software or hardware) that implements the problematic LFE in some embodiments.

A logical network, in some embodiments, includes a set of LFEs (e.g., L2 and L3 forwarding elements) that logically connects several different DCNs (e.g., VMs, containers, physical machines, etc.) that run on different host machines (e.g., of a hosting system) to each other and to other logical and/or physical networks. The logical forwarding elements that logically connect the DCNs, in some embodiments, define a logical network topology for a tenant of a hosting system (e.g., a datacenter). In some embodiments, different subsets of DCNs reside on different host machines that execute software MFEs. Each software MFE operates on a host machine and implements the LFEs of the logical network to which the local DCNs of the host machine are logically connected.

The software MFE, in some embodiments, is a software instance that is instantiated in a virtualization software (e.g., a hypervisor) of a host machine. Implementing the LFEs on a host machine, in some embodiments, includes performing network traffic forwarding processing for the packets that are originated from and/or destined for a set of DCNs that resides on the host machine on which the MFE operates. The LFEs are also implemented by one or more hardware MFEs (e.g., TOR switches) in order to logically connect the physical machines (e.g., servers, host machines, etc.) that are connected to the hardware MFEs to the other DCNs of the logical network. Additionally, as a particular physical host machine may host DCNs of more than one logical network (e.g., belonging to different tenants), the software MFE running on the host machine (or a hardware MFE) may be virtualized in order to implement different sets of LFEs that belong to different logical networks.

In order to diagnose a logical network issue, some embodiments analyze the consistency between desired states and realized states, as well as the consistency between discovered states and translated states of different logical network entities on a logical path. The logical network entities, in some embodiments, include any network element on a logical path such as a source or destination DCN (e.g., a source or destination virtual machine (VM)), a logical forwarding element (e.g., a logical L2 switch, a logical L3 router, a logical middlebox, etc.), and a tunnel endpoint (e.g., implemented by a transport node). While a DCN or tunnel endpoint typically operates on a single host machine, a logical forwarding element or logical middlebox, as stated above, spans multiple software and hardware MFEs.

A logical router, as will be described in more detail below by reference to FIGS. 7A-7B, includes a single distributed router (DR) and one or more service routers (SRs) in some embodiments. A DR, similar to a logical L2 switch, spans several transport nodes (e.g., host machines, gateways, etc.), while an SR operates only on an edge transport node (i.e., a gateway). A logical service can be applied to one or more LFEs and as such, the physical span of the logical service is the union of physical spans of all the LFEs, on which the logical service is applied.

In order to collect the realized and discovered states of a logical network entity (LNE), some embodiments collect configuration data (e.g., from the master manager and master controller of the LNE) to identify the transport nodes on which the LNE spans. A transport node, in some embodiments, operates on a hypervisor (e.g., of a host machine) or on a gateway as an edge of the virtual network. In some embodiments, the transport node can also be a hardware switch, which functions as a hardware virtual tunnel endpoint (VTEP). After identifying the transport nodes on which an LNE spans, some embodiments collect the different states data that is stored on each one of the transport nodes.

FIG. 1 illustrates a diagnostic tool of some embodiments that diagnoses a logical network and reports any logical network issue related to a logical network entity. The figure shows how the diagnostic tool receives different data from different network elements in order to diagnose the logical network entities based on the received data. FIG. 1 includes a diagnostic tool 110, a CMP cluster 115, a CCP cluster 120, and two host machines 135 and 140. Each host machine shown in the figure includes a software MFE 150 and a set of data compute nodes (e.g., VMs) 160. As stated above, in some embodiments, the MFEs 150 are implemented in the virtualization software (e.g., hypervisor) of the host machines 135 and 140 which is not shown in the figure for simplicity of description.

The CMP cluster 115 includes a set of central (or master) managers 125, while the CCP cluster 120 includes a set of central (or master) controllers 130. Each of the managers 125 and controllers 130 can be a physical computing device (e.g., a server, a computer, etc.), a DCN (e.g., a VM, a container, etc.), or a software instance (or a process) operating on a physical computing device or DCN. In some embodiments, a master manager includes different user interface applications for administration, configuration, monitoring, and troubleshooting of one or more logical networks in a hosting system. In some embodiments, the diagnostic tool is an application that also executes on a master manager of a logical network that is diagnosed by the diagnostic tool. A master controller of some embodiments includes network controlling plane applications that control the data communications between the different transport nodes of the logical network.

In some embodiments, a central management plane (CMP) cluster 115 (e.g., a master manager 125 in the CMP cluster) generates configuration data that defines a logical network. In some embodiments, a user (e.g., a network administrator) provides the logical network definition (e.g., logical network topology) to the CMP cluster through application programming interface (API) calls. The CMP cluster, based on the received logical network definition, generates the configuration data (e.g., by defining the logical switches, logical routers, logical middleboxes, etc.) and stores the generated configuration data in the management plane configuration database. The CMP cluster also pushes the generated configuration data to the CCP cluster 120 and to the MFEs 150. In some embodiments, the configuration date that is stored in the management plane (i.e., the desired state) is pushed to the CCP cluster and transport nodes asynchronously through different channels (e.g., through CMP—transport node channels, CMP—CCP channels, CCP—transport node channels). The configuration data that is stored in the physical nodes (e.g., transport nodes, CCP nodes, etc.) of the logical network at any given point of time constitutes the realized state of the physical node.

In some embodiments, although not shown in this figure, the CMP and CCP clusters also communicate with hardware MFEs (e.g., third-party TOR switches) in order to logically connect one or more physical machines (e.g., servers, host machines, etc.) that are connected to the hardware MFEs to the VMs that are connected to the software MFEs 150. The CMP cluster 115 communicates with the MFEs 150 on the host machines 135 and 140 through MP channels in order to configure and manage different logical networks. These logical networks logically connect different sets of end machines operating on the host machine 135 to different sets of end machines that operate on the host machine 140 (and to other physical machines that are connected to other hardware and software MFEs).

The central control plane (CCP) cluster 120 controls the network data communication between the different DCNs of a logical network (e.g., between some of the VMs 160 in the illustrated example) by controlling the data communication between the MFEs 150. The CCP cluster 120 communicates with the MFEs 150 in order to control the data exchange between the MFEs since the MFEs are the transport nodes that ultimately exchange the logical network data between the DCNs. In order to control the data exchange, the CCP cluster of some embodiments receives runtime data of the logical network entities (e.g., VMs 160, LFEs of the logical network, etc.) from each of the MFEs. The CCP cluster 120 also receives the configuration data from the CMP cluster 115 through the MP channels and uses the configuration data along with the runtime data in order to control the data communications of the logical network. That is, based on the runtime data received from the MFEs (i.e., the discovered state) and the configuration data received from the CMP cluster (i.e., the desired state), the CCP cluster generates a set of data (i.e., the translated state) that is pushed to and shared with the MFEs. In some embodiments, the CCP cluster uses other data that is generated and stored by the CCP cluster (e.g., sharding tables) in order to generate the translated state. The translated state is used by the MFEs in order to physically exchange the data that is logically forwarded by one or more LFEs that the MFEs implement.

As stated above, the runtime information discovered at a transport node constitutes the discovered state of the transport node in some embodiments. The runtime data of some embodiments (e.g., a VNIC connection status, IP and MAC addresses of a VNIC, data about an application executing on a VM, etc.) is discovered from a compute stack or application. In some embodiments, the discovered state (e.g., runtime logical L2 and L3 tables) of each transport node is different than the discovered state of the other transport nodes even though all of the transport nodes implement the same set of logical forwarding elements. This is because when the configuration data is pushed down from the CMP cluster 115 towards the MFEs 150, a local controller that operates on each host machine (e.g., in the hypervisor of the host machine) first receives the configuration data. The configuration data that each local controller (not shown in the figure) receives defines common forwarding behaviors of the MFEs 150. Each local controller then generates customized configuration data that defines specific forwarding behaviors of each MFE that operates on the same host machine on which the local controller operates.

This customized forwarding behavior is partly generated based on the specific characteristic of the MFE for which the data is generated (e.g., physical port addresses of the MFE, etc.). The CCP cluster 120 generates a translated state for the logical network (i.e., for the logical network entities) based on (1) the different discovered states received from the MFEs and (2) the configuration data received from the CMP cluster 110 (which includes the logical network definition and topology). This translated state is then used by the MFEs to establish tunnels to exchange the logical network data (i.e., to use a particular tunnel protocol such as a Virtual Extensible Local Area Network (VXLAN) protocol to encapsulate the packets with the tunneling data).

Typical configuration data, in some embodiments, includes data that defines the location of DCNs (e.g., the location of VMs on host machines), data that defines connection topology between the DCNs and locations of the LFEs in the topology, data that defines middlebox services, which are applied to the LFEs (e.g., distributed firewall policies), etc. Typical runtime data, in some embodiments, includes layer 2 control plane tables such as virtual tunnel endpoint (VTEP) tables, media access control (MAC) tables, address resolution protocol (ARP) tables; layer 3 routing tables such as routing information base (RIB) tables, forwarding information base (FIB) tables; statistics data collected from transport nodes, etc.

The diagnostic tool 110 of some embodiments receives the desired state of a logical forwarding element that the tool is analyzing from the master manager of the LFE in the CMP cluster 115. The tool also receives the realized state of the same LFE from the master controller of the LFE in the CCP cluster 120, and from the transport node (i.e., one or both of the MFEs 150) that implements the LFE. The diagnostic tool 110 also receives (i) the translated state of the LFE from the master controller and (ii) the discovered state of the LFE from the transport node. In some embodiments, the diagnostic tool 110 reports the LFE as a problematic LFE, along with the transport node, master controller, and master manager of the LFE, when (i) the realized state data is not consistent with the desired state data, and/or (ii) the translated state data is inconsistent with the discovered state data of the LFE.

One of ordinary skill in the art would realize that the number of the host machines, central managers and controllers, and virtual machines illustrated in the figure are exemplary and a logical network for a tenant of a hosting system may span a multitude of host machines (and third-party switches), and logically connect a large number of DCNs to each other (and to several other physical devices). Additionally, while shown as VMs in this figure and other figures below, it should be understood that other types of data compute nodes (e.g., namespaces, containers, etc.) may connect to logical forwarding elements in some embodiments.

Figure 2:
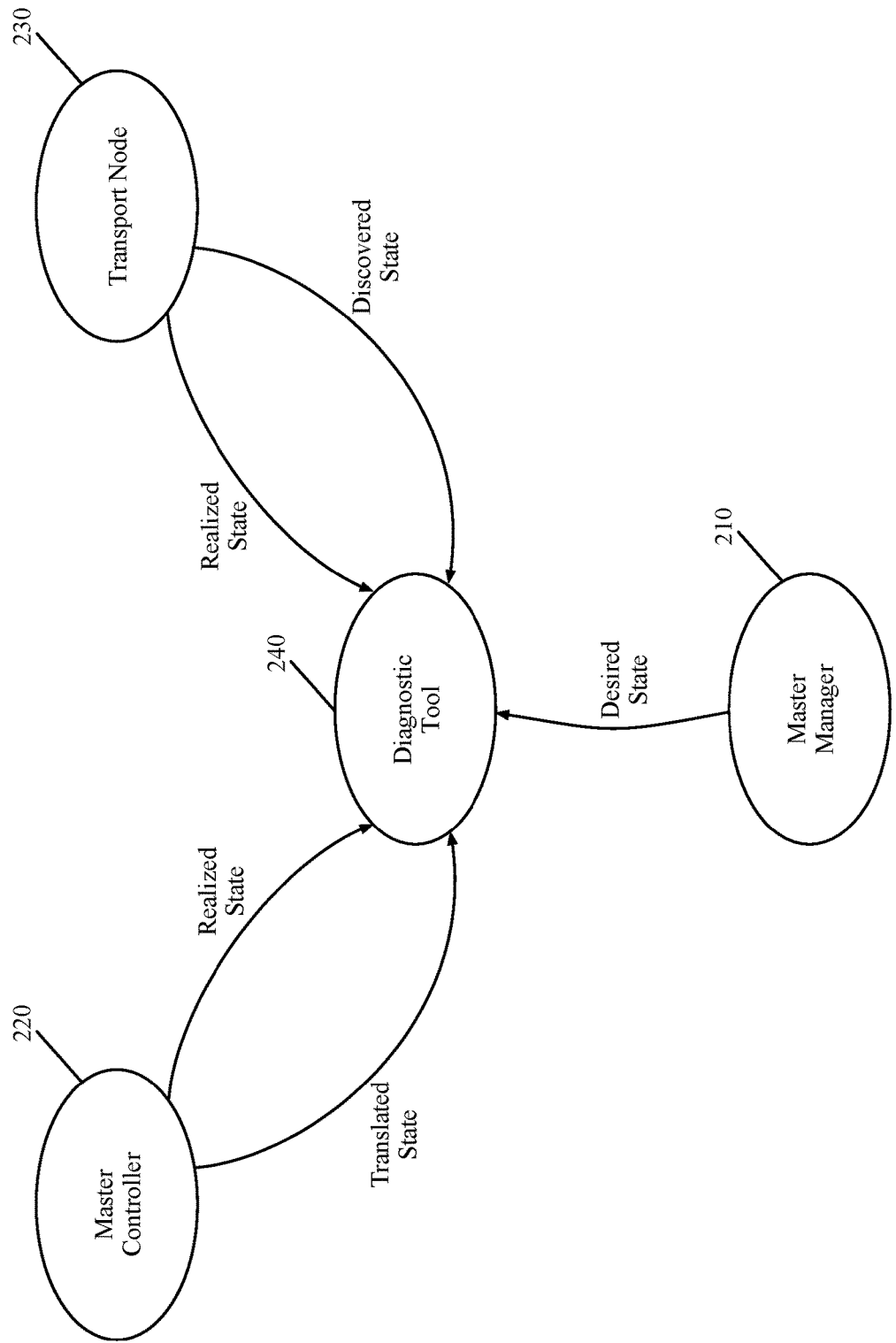
FIG. 2 conceptually illustrates a diagnostic tool of some embodiments that receives data related to different states of a logical network element such as a logical forwarding element from different physical nodes of a physical network.

FIG. 2 conceptually illustrates a diagnostic tool of some embodiments that receives data related to different states of a logical network element (LNE) such as a logical forwarding element from different physical nodes of a physical network (e.g., a datacenter network). More specifically, this figure shows the diagnostic tool 240 receiving (1) realized and translated states of the LFE from the master controller 220, (2) realized and discovered states of the LFE from the transport node 230, and (3) desired state of the LFE from the master manager 210. Each one of these different physical nodes (i.e., the transport node and the master manager and controller) stores data that is generated by the physical node, and/or received from another node, as a particular state of the LFE. The different states data enables the transport node to perform the data forwarding functionality for the LFE.

The master manager 210, as stated above, is a computing device (e.g., a manager computer, a manager server, etc.) or an application in the CMP cluster of some embodiments. In some embodiments, two or more master manager applications that are masters of two or more logical networks operate on a same manager computing device. In some other embodiments, each master manager application runs on a separate and dedicated manager computing device. The master manager receives a definition of a logical network and based on that definition generates configuration data that defines the logical network topology and the different logical entities of the logical network. As such, the configuration data related to a logical network entity (e.g., an LFE) is stored as the desired state of the logical network entity in the master manager 210. The master manager distributes the generated configuration data to both transport node and master controller of the transport node.

In some embodiments, the master controller 220 is a separate controller computing device (e.g., a controller computer, a controller server, etc.) or an application in the CCP cluster. In some embodiments two or more master controller applications that are masters of two or more logical networks operate on a same controller computing device. In some other embodiments, each master controller application runs on a separate and dedicated controller computing device. Yet, in some other embodiment different combinations of master manager applications and master controller applications execute on the same computing device. For example, in some embodiments, the master manager and controller of a particular logical network execute, as two separate applications, on the same computing device.

The configuration data received and stored at the master controller includes the realized state of the LFE. The realized state of an LFE may change based on the runtime data that the master controller receives from the transport nodes that implement the LFE, or based on any updated configuration data that is received from the master manager. For example, when the LFE is a logical switch and a user (e.g., the network administrator) adds a logical router to the logical switch, the realized state of the LFE on the master controller changes based on the new configuration data that the master manager pushes to the master controller. Similarly, when a new DCN (e.g., a VM for an existing tenant) is added to a host machine and is coupled to the LFE which is implemented by the transport node of the host machine, the realized state of the LFE on the master controller (as well as the desired state of the LFE on the master manager) changes based on the addition of the new DCN.

The transport node 230, in some embodiments, is a managed forwarding element that executes on a virtualization software (e.g., a hypervisor) of a host machine or on a gateway as an edge node of a logical network. In some embodiments, the transport node can also be a hardware switch (e.g., a third-party TOR switch) that functions as a hardware VTEP. In general, a transport node 230 is a managed forwarding element (software or hardware) that implements one or more LFEs of a logical network in order to logically connect a set of end machines (virtual or physical) that is connected to the transport node (1) to each other, (2) to other end machines that are connected to other transport nodes that also implement the LFEs, and (3) to other logical and physical networks (e.g., external networks).

The configuration data received and stored at the transport node also includes the realized state of the LFE. The realized state of an LFE on a transport node that implements the LFE may change based on the runtime activities of the transport node, or based on any updated configuration data that is received from the master manager. Similar to the example given for the master controller, when the LFE is a logical switch and a user adds a logical router to the logical switch, the realized state of the LFE on the transport node changes based on the new configuration data that the master manager pushes to the transport node. Similarly, when a new VM is added to a host machine executing the transport node (e.g., migrated to the host machine) and is coupled to the LFE that is implemented by the transport node, the realized state of the LFE on the transport node (as well as the desired state of the LFE on the master manager) changes based on the addition of the new VM.

Additionally, the master controller 220 of some embodiments exchanges runtime data with the transport node 230 in order to control the network traffic exchange between the transport node 230 that implements an LFE and other transport nodes that also implement the LFE. The master controller 220 exchanges the runtime data with the transport node 230 through a CP channel (not shown). In some embodiments, the transport node 230 discovers the runtime state of the LFE (e.g., the forwarding tables that the transport node has generated to implement the LFE based on the received configuration data) and delivers the discovered state to the master controller 220 in the CCP cluster through the CP channel. The master controller 220 then shares the discovered state received form the transport node 230 with the other transport nodes that also implement the LFE.

The shared state of the LFE that is stored in the master controller is called the translated state of the LFE and is used by the other transport nodes to control the data exchange between the transport nodes. For example, the transport node 230 can set up tunnels (or DP channels) between the transport node 230 and other transport nodes in order to exchange packets with the other transport nodes based on the discovered state of the LFE stored in the transport node 230 and the translated state of the LFE stored in the master controller 220.

Because of runtime network activities (e.g., addition of VMs to different hosts, deletion of VMs from the hosts, etc.) the data related to discovered and translated states may be inconsistent (i.e., the data that is stored in the master controller 220 for a logical network entity may not match the data that is stored in the transport node 230 for the same LNE). Similarly, because of the network activities, the data related to desired and realized states may be inconsistent (e.g., the data that is stored in the master manager 210 for an LNE may not match the data that is stored in the transport node 230 and/or the data that is stored in the master controller 220 for the same LNE). The inconsistency between different states can be caused for different reasons. For example, when the management plane data is pushed from a master manager to a transport node (or when the control plane data is pushed from the master controller to the transport node), the transport node applies the data locally. The locally applied data can be inconsistent with the data that was pushed to the transport node for various different reasons (e.g., part of the data is lost during the data transmission, runtime errors occurred on the transport node when applying the data, etc.).

In some embodiments, the diagnostic tool 240 identifies and reports a logical network entity (e.g., a VM, a tunnel endpoint, a logical switch, a logical router, etc.) as a problematic element when it is determined that the desired state of the element that is stored in the master manager 210 is not consistent (1) with the realized state of the element stored in the master controller 220, and/or (2) with the realized state of the element stored in the transport node 230. The diagnostic tool 240 of some embodiments also identifies and reports a logical network entity as having logical network issues when the diagnostic tool determines that the translated state of the element stored in the master controller 220 is inconsistent with the discovered state of the element stored in the transport node 230.

Figure 3:
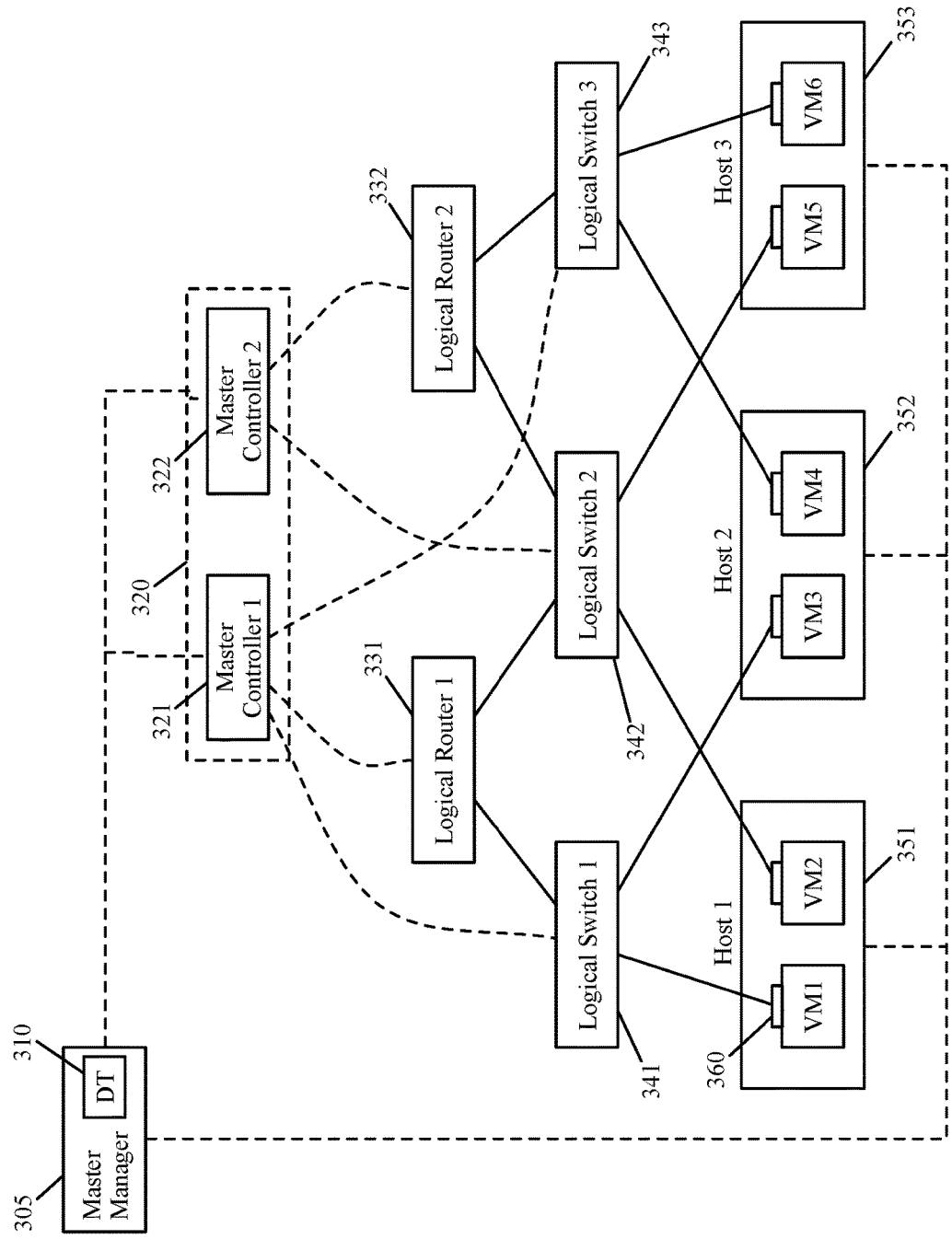
FIG. 3 illustrates different logical and physical nodes of an exemplary distributed virtual network (e.g., of a tenant of a hosting system) and the relationships between the different logical and physical nodes.

FIG. 3 illustrates different logical and physical nodes of an exemplary distributed virtual network (e.g., of a tenant of a hosting system) and the relationships between the different logical and physical nodes. The figure shows the logical relationships among the LFEs and the VMs that are implemented over (or placed in) the host machines of an infrastructure physical network (e.g., the hosting system's physical network). As illustrated, the logical network includes different logical forwarding elements such as logical routers 331 and 332, logical switches 341-343. The figure also includes two master controllers 321 and 322 (which are, e.g., part of a CCP cluster), a master manager 305, and host machines 351-353 that host VM1-VM6.

The virtual machines VM1-VM6, which execute on host machines 351-353, use the logical switches 341-343 for L2 packet switching operations and logical routers 331 and 332 for L3 packet routing operations through the VMs' virtual network interface controllers (VNICs) 360 (only numbered for VM1). The LFEs have their functionalities distributed across different transport nodes. For example, in some embodiments, each of the logical routers 331 and 332 is a virtual distributed router that spans (i.e., is implements on) multiple MFEs that execute in the host machines 351-353. Likewise, in some embodiments, each of the switches 341-343 is a virtual distributed switch that spans the MFEs that execute in the host machines 351-353.

As illustrated, the logical switch 341 logically connects VM1 to VM3, while the logical switch 342 logically connects VM2 to VM5 and the logical switch 343 logically connects VM4 to VM6. Furthermore, logical switches 341 and 342 are logically connected through the logical router 331, while the logical switches 342 and 343 are logically connected through the logical router 332. Therefore, if VM1 wants to send a packet to VM5, the packet has to be transmitted through the VNIC 360 of VM1 to logical router 331, from the logical router 331 to the logical switch 342, and from the logical switch 342 to VM5 (through the VNIC of VM5). As such, if the packet does not reach VM5, any of these LFEs (i.e., logical switches 341-342 and logical router 331) might be at fault, as well as any of the source and destination VMs (i.e., VM1 and VM5, respectively) and their corresponding VNICs. Also the problem in the communication could be caused by any of the source and destination tunnel endpoints (not shown) that are implemented in the MFEs executing on the host machines 351 and 353.

The two master controllers 321 and 322 shown in FIG. 3 are masters of different logical forwarding elements of the same logical network. In other words, this figure shows that a single logical network can have more than one master controller (or master manager) that control (or manage) the different LFEs of the logical network. Although there can be multiple managers and multiple controllers that are masters of different LNEs in a virtual network, each LNE can only have one master manager that stores its desired state and one master controller that shares its translated state.

As shown in the figure, master controller 321 is the master of logical router 331, as well as logical switches 341 and 343. That is, master controller 321 controls the forwarding operations of the MFEs (not shown) that implement the logical router 331 and logical switches 3241 and 343 on the host machines 351-353. Similarly, master controller 322 is the master of logical router 331 and logical switch 342 and controls the network traffic for the MFEs that implement these logical forwarding elements.

The network traffic is exchanged between the different host machines (i.e., different VMs running in the host machines) through logical overlay tunnels using the physical network infrastructure (e.g., physical NICs of the host machines). Each MFE exchanges the required control tables data (e.g., L2 and L3 forwarding tables) with a corresponding master controller in order to perform the forwarding functionality for the LFE that the MFE implements. In some embodiments, as stated above, each master controller is a dedicated computing device (e.g., a master controller computer), or a controller application that executes on a computing device. In other words, the two master controllers 321 and 322 could be two controller applications that execute on two different controller computers or on the same controller computer in a CCP cluster.

The master manger 305 shown in the figure is responsible for receiving the logical network definition (e.g., from a user) and configuring the different transport nodes (executing on the host machines) and the master controllers to implement the logical network. In some embodiments, as shown in this figure, the diagnostic tool 310 is an application or module that executes on the master manager 305 of the logical network. As such, the diagnostic tool 310 uses the MP channels of the master manager to communicate with the different transport nodes and controllers of the logical network. Through these MP channels the manager receives the realized and discovered states of the transport nodes as well as the realized and translated states of the master controllers. The diagnostic tool 310 also receives the desired state of the logical network from the master manager 305 on which the diagnostic tool executes.

The diagnostic tool 310 of some embodiments is used by a user (e.g., network administrator) to diagnose the distributed virtual network and reports any potential network issues. The diagnostic tool 310 provides a user interface for diagnosing the various logical network entities of the distributed virtual network. The diagnostic tool 310, in some embodiments allows the user to provide the logical network paths or entities that must be diagnosed (e.g., a logical forwarding element, a logical path between two DCNs, different paths between a source VM and different destination VMs, etc.) in order to analyze and report the problematic entities along with their transport nodes and master controllers and managers.

Figure 4:
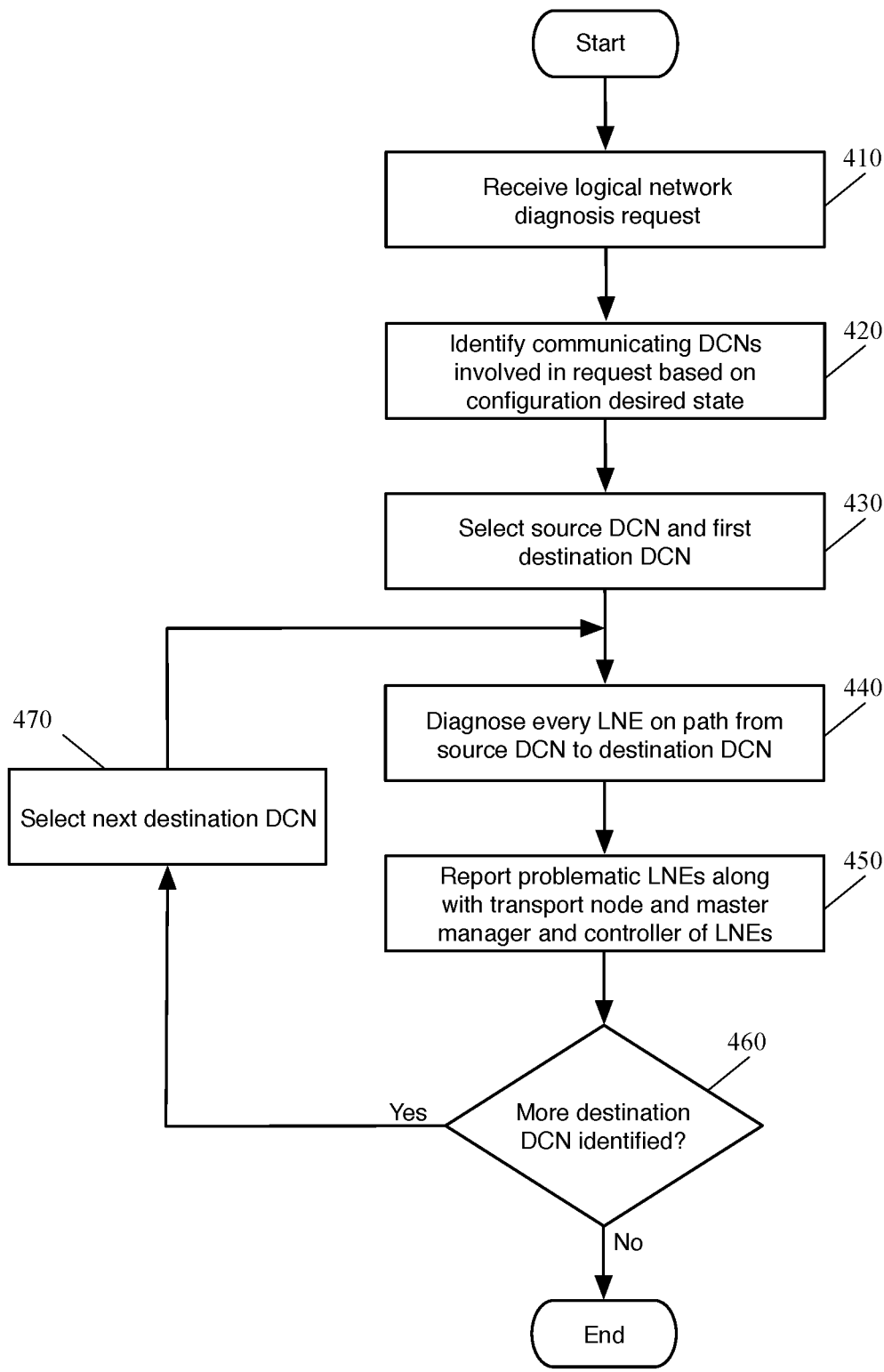
FIG. 4 conceptually illustrates a process of some embodiments for diagnosing a logical network in order to report logical network issues.

FIG. 4 conceptually illustrates a process 400 of some embodiments for diagnosing a logical network in order to report logical network issues. In some embodiments, process 400 is performed by a diagnostic tool application that executes on a master manager of the logical network. In some other embodiments, the diagnostic tool is a centralized application that executes on a global manager that manages all other master managers in the CMP cluster, each of which manages a different logical network. In yet some other embodiments, the diagnostic tool runs on a dedicated machine that only performs logical network diagnosis for one or more logical networks of a hosting system.

As shown in FIG. 4, the process 400 begins by receiving (at 410) a logical network diagnosis request. The request can be received from through a user input (e.g., a command line interface or a graphical user interface) or automatically when a network issue is detected (e.g., a data packet does not reach a desired destination). In some embodiments, the diagnostic tool receives the diagnosis request through a user input. Different examples of a network diagnosis request, in some embodiments, include a request to diagnose a connection failure between specific source and destination DCNs (e.g., when a unicast packet sent from the source DCN does not reach the destination DCN); a request for a non-responsive LFE diagnosis, which connects multiple DCNs to each other; a request to diagnose multiple paths between a source DCN and several different destination DCNs (e.g., when a multicast packet does not reach one or more of the destinations); etc.

After receiving the request, the process identifies (at 420) two or more DCNs (e.g., VMs that operate on different host machines) that are involved in the diagnosis request. The process of some embodiments identifies the DCNs by receiving the configuration data from the master manager of the logical network and identifying the logical network topology based on the configuration data (i.e., the desired state). The process then selects (at 430) the source DCN and a destination DCN based on the identified topology of the involved DCNs. For example, when the request is for analyzing a problematic logical switch, based on the topology of the network, the process may identify four different VMs, the physical ports (VNICs) of which, are associated with four logical ports of the logical switch. As such, the process selects one of the VMs as a source VM and another VM as a destination VM. Alternatively, when the request is for diagnosing a connect failure between two specific VMs the process selects one of the two VMs as the source VM and the other VM as the destination VM.

The process 400 then identifies and diagnoses (at 440) every logical network entity (e.g., source and destination VMs, VNICs of the VMs, logical switches and/or routers, etc.) that is placed on the logical path between the source and destination DCNs (including the source and destination DCNs themselves). Identification and diagnosis of the LNEs are discussed in more detail below by reference to FIG. 5. Essentially, in some embodiments, the diagnostic tool identifies every LFE on the logical path as well as the logical services that each LFE receives based on the configuration data stored in the master manager. The diagnostic tool of some embodiments also identifies the physical span of each LFE and any logical service that the LFE receives based on the configuration data stored in the master manager of the LFE (e.g., the desired state) as well as the configuration data stored in the master controller of the LFE (e.g., the translated state).

In some embodiments, the tool identifies a source MFE that is connected to the source DCN and a destination MFE that is connected to the destination DCN. The tool then, starting from the first LFE on the logical path to the last LFE, receives the discovered state and realized state of each LFE (as well as any logical service that the LFE receives) from the source MFE, which implements the LFE. The realized state is compared to the desired state of the LFE stored in the master manager of the LFE and the discovered state is compared to the translated state of the LFE stored in the master controller of the LFE. In some embodiments, the diagnostic tool also analyses the different states of the last LFE (as well as any logical service that the last LFE receives) that is stored in the destination MFE, which implements the last LFE.

After finishing the analysis of the different states of the LFEs on the source MFE, the diagnostic tool of some embodiments starts analyzing the LFEs on the logical patch from the destination MFE to the source MFE in the same manner. That is, starting from the last LFE on the logical path to the first LFE, the tool receives the discovered state and realized state of each LFE (as well as any logical service that the LFE receives) from the destination MFE, which implements the LFEs. In some embodiments, the diagnostic tool also analyses the different states of the first LFE that is stored in the source MFE, which implements the first LFE.

When the process 400 identifies a problematic LNE during the diagnosis of the logical path, the process reports (at 450) the problematic LNE along with the transport node that implements the LNE, as well as the master manager and controller of the LNE. In some embodiments, the process reports the problematic LNE as soon as the process determines that the different states of the LNE do not match each other (as described above). In some other embodiments, the process first identifies all the problematic LNEs and then reports the LNEs all together and at the same time (along with associated transport node and master controller and manager).

After reporting the logical network issues and the physical nodes that are associated with the issues, the process determine (at 460) whether there are more destination DCNs associated with the source DCN. When the process determines that there are no more destinations left to process (e.g., the diagnosis request was for a specific connection between two DCNs), the process ends. On the other hand, When the process determines that there are still destinations DCNs that have to be processed (e.g., the diagnosis request was for multiple paths between multiple DCNs), the process selects (at 470) the next destination and returns to 440 to diagnose the LNEs on the new logical path.

The specific operations of the process 400 may not be performed in the exact order shown and described. The specific operations may not be performed in one continuous series of operations, and different specific operations may be performed in different embodiments. For example, when several different DCNs are involved in the logical network issue (e.g., three or more DCNs are connected to a faulty LFE) and the process determines that the last destination DCN is diagnosed, the process of some embodiments does not end (as described above). Instead, the process of some such embodiments selects another DCN as the new source DCN and then selects each one of the other DCNs as the new destination DCNs. The process analyzes the paths between each pair of DCNs until every path between each DCN and every other DCN is analyzed.

Additionally, as will be described in more detail below, when there is a network issue in data communication between two DCNs, there might be either an error in the path from the first DCN to the second DCN, or an error in the path from the second DCN to the first DCN. As such, the analysis of each logical path is bidirectional in some embodiments. That is, the process 400 of some embodiments, after diagnosing the logical path from the source DCN to the destination DCN, diagnoses the logical path from the destination DCN to the source DCN. The process performs the reverse diagnosis before the process selects the next destination DCN (e.g., at 470). Furthermore, the process 400 could be implemented using several sub-processes, or as part of a larger macro process. For example, steps 440 and 450 of the process 400 are implemented as several steps of the process 500, which is described below by reference to FIG. 5.

Figure 5:
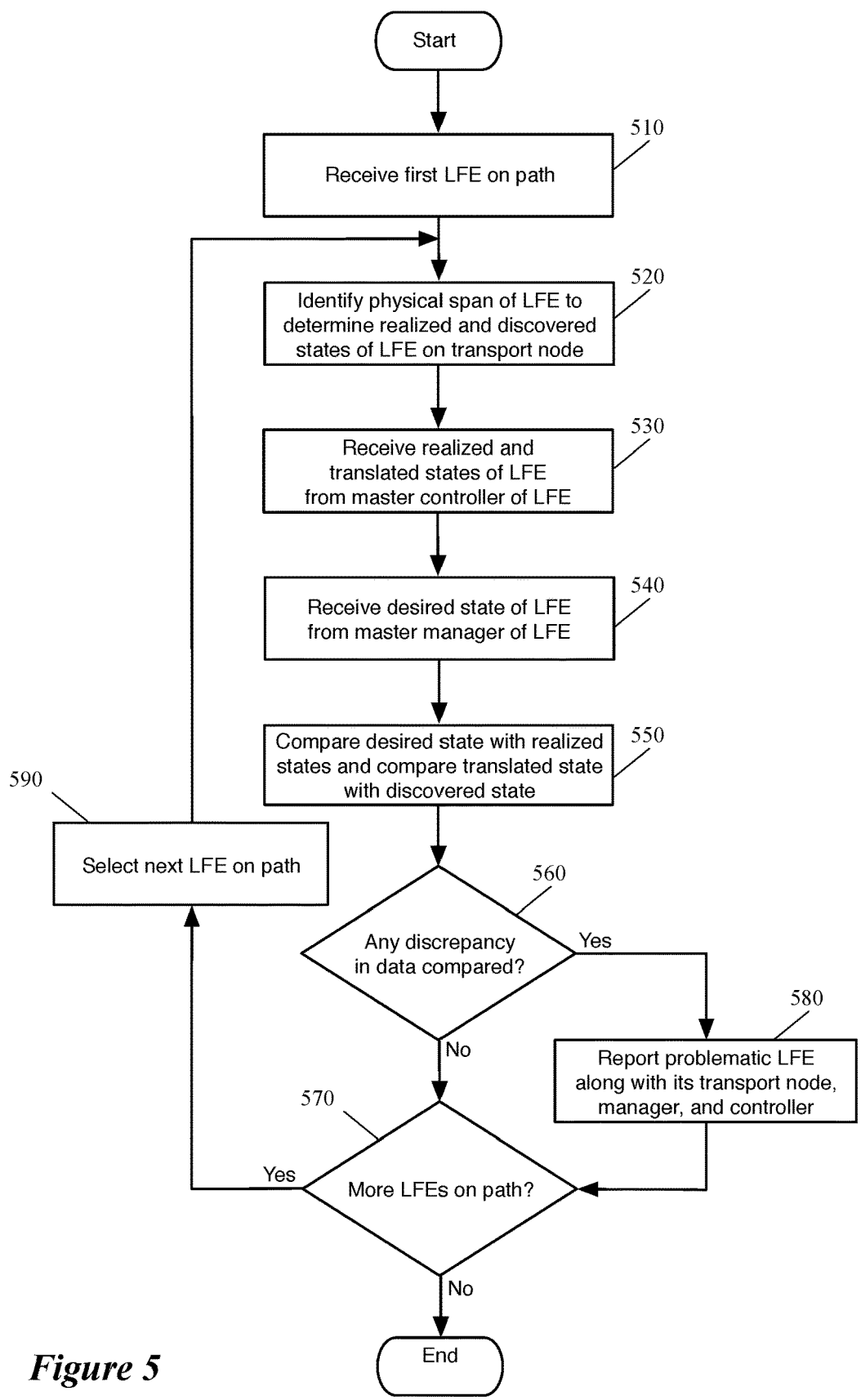
FIG. 5 conceptually illustrates a process of some embodiments for diagnosing each logical path between two identified data compute nodes.

FIG. 5 conceptually illustrates a process 500 of some embodiments for diagnosing each logical path between two identified DCNs. Each logical path, in some embodiments, contains a source DCN, a destination DCN, and one or more logical forwarding elements in between the DCNs that may or may not receive one or more logical services. In some embodiments, process 500 is performed by a diagnostic tool application (e.g., executing on a master manager, executing on a dedicated diagnostic computer, etc.). Although in the illustrated figure, the process diagnoses the path in one direction only, the diagnostic tool of some embodiments performs the exact same process in a second reverse direction after the first direction is diagnosed. In other words, the diagnostic tool of some embodiments diagnoses each logical path between each pair of endpoints (e.g., a pair of DCNs) bidirectionally.

In some embodiments, the diagnostic tool receives and analyzes the different states of the source and destination DCNs that are connected to the source and destination MFEs that implement the LFEs. Such analysis, in some embodiments, includes diagnosing the different states of the DCNs, the connecting ports of the DCNs (e.g., virtual network interface controllers of the DCNs) that connect the DCNs to their corresponding MFEs, and the tunnel endpoints that are implemented by the MFEs in order to establish a tunnel (e.g., VXLAN tunnel, STT tunnel, Geneve tunnel, etc.) that connects the corresponding MFEs. However, since the physical span of these logical network entities is always the host machines on which the DCNs execute, the identification and analysis of their different states are not discussed in this figure. Otherwise, it should be understood that the discussions provided for the LFEs in this figure are equally applicable to other LNEs such as the VNICs of the DCNs and the tunnel endpoints that are implemented by the MFEs (e.g., in the hypervisor of the host machines).

The process 500 starts by receiving (at 510) the first LFE on the logical path between the two DCNs. The process of some embodiments identifies the different LFEs that are placed on the logical path between a pair of DCNs based on the desired state data received from the master manager (or managers) of the LFEs (which yields the logical network topology that includes the logical path). The process then identifies (at 520) the physical span of the first LFE. As stated above, the physical span of an LFE, in some embodiments, includes the transport nodes on which the distributed logical LFE is implemented. In other words, the physical span of an LFE includes the transport nodes that perform forwarding processing (e.g., L2 processing, L3 processing, etc.) for the LFE on a physical node of the network infrastructure (e.g., on a host machine, on a gateway machine, etc.).

In some embodiments, the process identifies the physical span of the logical ports of the LFE that are involved in the logical path. That is, the process identifies the transport node, on which the logical port of the LFE that is logically connected to the DCN or another logical port of another LFE, is implemented. In some embodiments, the process identifies the physical span of the LFE (e.g., the logical port of the LFE) based on the desired state data received from the master manager of the LFE and the translated state data received from the master controller of the LFE.

After identifying the transport node on which the first LFE is implemented (e.g., the transport node that implements the LFE's logical port which is associated with a VNIC of the source DCN), the process retrieves the realized and discovered states of the LFE from the identified transport node. That is, the process receives the configuration and runtime data related to the LFE from the identified transport node. The process of some embodiments also identifies the master manager and controller of the LFE. From the master controller of the LFE, the process receives (at 530) the realized and translated states of the LFE (i.e., the configuration and runtime data related to the LFE that is stored at the master controller). The process also receives (at 540) the desired state of the LFE (i.e., the configuration and runtime data related to the LFE that is stored at the master controller).

After retrieving all the different states data from the physical nodes (i.e., the master manager and controller as well as the transport node), the process compares (at 550)

the realized states of the LFE with the desired state of the LFE. That is, the process compares the configuration data related to the LFE that is stored in the master controller and the configuration data stored in the transport node with the configuration data related to the LFE that is generated at the master manager of the LFE. The process of some embodiments also compares the translated state with the discovered state. That is, the process compares the runtime data related to the LFE that is stored in the master controller with the runtime data that is stored in the LFE.

At 560, the process determines whether any inconsistency between the data of the different states exits. For example, when the LFE is a logical L2 switch, the process matches the L2 forwarding tables (e.g., ARP table, VTEP table) data that is stored in the transport node against the same data for the transport node that is stored in the master controller. When the process identifies that the data does not match (e.g., a MAC or IP address in the VTEP table of the transport node does not match a corresponding MAC or IP address in the VTEP table of the master controller), the process determines that a discrepancy between the discovered and translated states exists. When any discrepancy is identified, the process reports (at 580) the LFE as a problematic LFE along with the LFE's transport node (and host machine that executes the transport node) and master manager and controller. The process then proceeds to 570, which is described below.

On the other hand, when the process determines (at 560) that no discrepancy exists between the data of any of the states, the process determines (at 570) whether more LFEs to diagnose are identified on the logical path. When the process determines that there are no more LFEs on the logical path, the process ends. On the other hand, when there are more LFEs on the logical path, the process selects (at 580) the next LFE on the logical path and returns to 520 in order to repeat the diagnosis steps for the next LFE.

The specific operations of the process 500 may not be performed in the exact order shown and described. For example, in some embodiments, the process first identifies every problematic LFE on the entire logical path and then reports them all at the same time. Additionally, the specific operations may not be performed in one continuous series of operations, and different specific operations may be performed in different embodiments. For example, the process of some embodiments, after identifying the physical span of the LFE (or the logical port of the LFE), also identifies the physical span of logical service(s) to the LFE (or to the logical port of the LFE).

That is, the process identifies the physical span of one or more logical middleboxes that provide the logical services in the same manner that the physical span of the LFE is identified (i.e., based on the desired and translated states of the logical middlebox). The process then performs the same comparisons on the different states data of logical service(s) that are stored in the transport nodes implementing the logical service(s) and the master manager and controller of the logical service(s). Lastly, one of ordinary skill in the art would realize that the process 500 could be implemented using several sub-processes, or as part of a larger macro process.

Figure 6A:
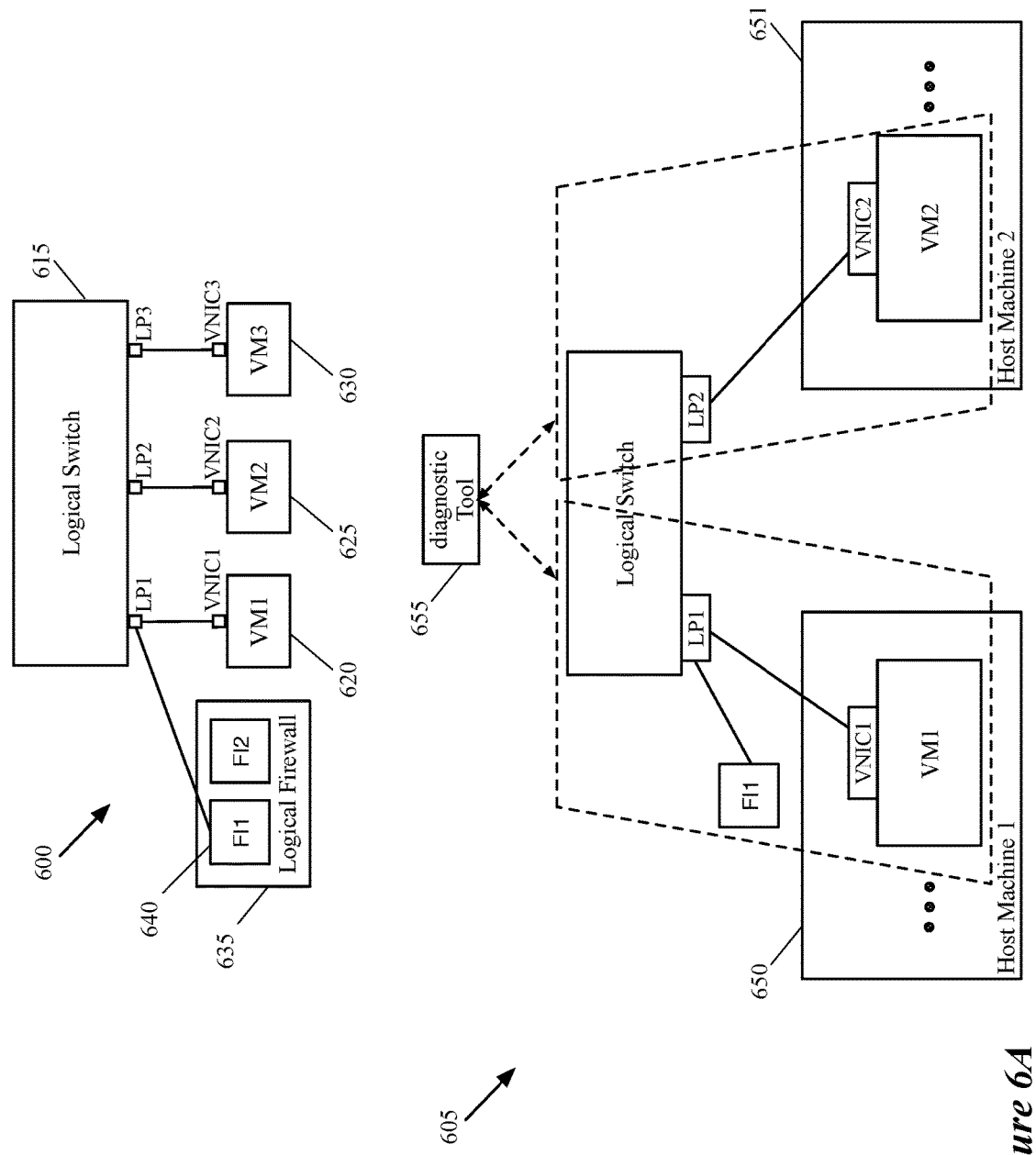
FIGS. 6A-6B illustrate an example of diagnosing a logical path that includes one logical switch.
Figure 6B:
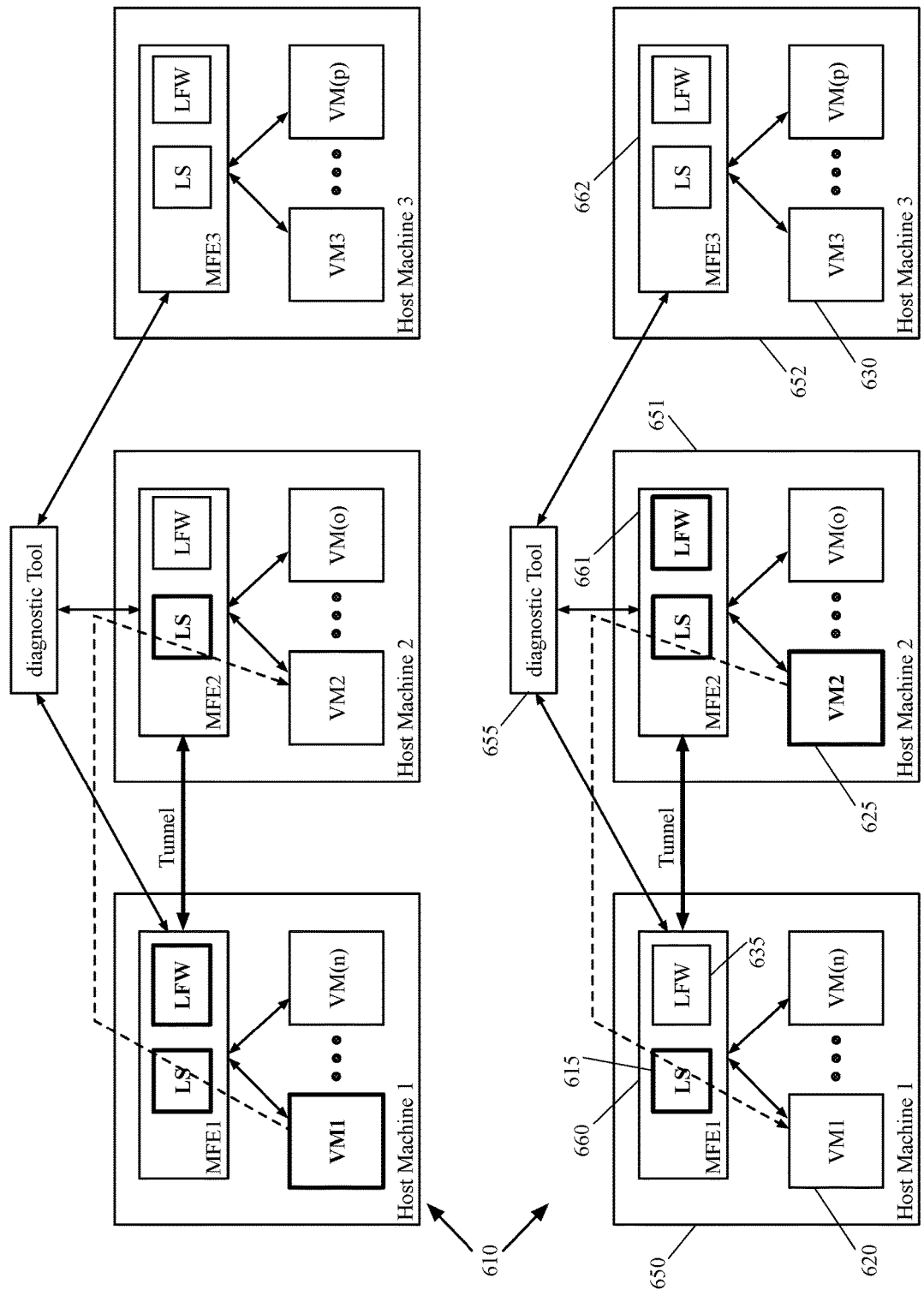

FIGS. 6A-6B illustrate an example of diagnosing a logical path that includes one logical switch. More specifically, the figures show how a logical switch, which logically connects two different DCNs running on two different host machines, is diagnosed in some embodiments. The top half of FIG. 6A shows a logical network portion 600, and the bottom half shows a physical network portion 605 that includes the logical network entities (LNEs) that are involved in a logical path between some of the VMs. The logical network portion 600 includes a logical switch (e.g., an L2 switch) 615 that logically connects three different data compute nodes (VM1-3) 620-630 to each other (and to other DCNs that are not shown). These VMs may belong to a tenant of a hosting system.

Each VM is logically connected to the logical switch through the VM's virtual interface controller (VNIC), which is associated with a logical port of the logical switch. Specifically, the VMs 620-630 are connected to the logical ports LP1-3 of the logical switch 615 through their corresponding interfaces VNIC1-3, respectively. The logical network portion 600 also includes a distributed virtual firewall (logical firewall) 635 that includes two firewall instances FI1 and FI2. Each of these firewall instances applies a firewall policy to one or more logical ports of different LFEs in some embodiments. In the illustrated example, the logical firewall 635 applies a firewall policy to the first logical port LP1 of the logical switch 615 through the firewall instance 640.

The physical network portion 605, shown in the bottom half of the figure, includes two separate host machines 650 and 651 (e.g., of a hosting system). The host machine 650 hosts the VM 620, while the host machine 651 executes the VM 625. As such, the different logical network entities that are involved in a communication issue between the virtual machines VM1 and VM2 include VM1, VNIC1, logical switch 615 (and the logical ports LP1 and LP2 of the logical switch), FI1 (i.e., the firewall instance that applies the firewall policy to LP1), VNIC2 and VM2. Additionally, the source and destination tunnel endpoints (i.e., source and destination VTEPs) are other LNEs that are involved in the logical path.

As will be described in more detail below by reference to FIG. 6B, depending on which directional logical path is diagnosed, different states of the LNEs are received from different transport nodes. For instance, in the logical path from VM1 to VM2, the LNEs VM1, VNIC1, LP1, and FI1 are either associated with or implemented by a transport node that executes on the host machine 650, while the LNEs VM2, VNIC2 and LP2 are either associated with or implemented by a transport node that executes on the host machine 651. Additionally, the different states of the source and destination VTEPs are received from the transport node.

The bottom half of FIG. 6A also shows a diagnosis tool 655 that receives the different states of each of these logical network entities from either the transport node that operates on the host machine 650, or the transport node that operates on the host machine 651. As described above, the diagnostic tool is a module or application that executes on a mater controller of a logical network in some embodiments. In some other embodiments, the diagnosis tool 655 is a dedicated diagnostic machine that communicates with all the physical nodes (i.e., transport nodes, CCP cluster, CMP cluster, etc.) of a logical network.

FIG. 6B illustrates a physical network 610 that implements the logical network portion 600. The top half of this figure shows the logical network entities that are diagnosed on an east-west logical path from the source VM 620 to the destination VM 625. The diagnosed network elements include the LNEs on the logical path, through which a packet has to pass in order to be transmitted from the source VM1 to the destination VM2. The bottom half of the figure shows the same LNEs, except that the LNEs are now diagnosed on a west-east logical path from the source VM 625 to the destination VM 620. The diagnosed network elements in the west-east path include the same LNEs, through which a packet has to pass in order to be transmitted from the source VM2 to the destination VM1. However, when an LNE spans multiple transport nodes, the transport node from which the different states of the LNE are received, differs from one directional path (e.g., the east-west path) to another directional path (e.g., the west-east path). This will be further described below when the bottom half of the figure is described.

In some embodiments, when the network traffic does not leave the virtual network (e.g., which is implemented on a hosting system network infrastructure) and terminated within the virtual network, the network data is only transported among the transport nodes and is called east-west (or west-east) traffic. Conversely, when either the source or destination endpoint of the traffic is placed outside the virtual network (e.g., in another external network), the network traffic is called north-south (or south-north) traffic, in which case, the network traffic must pass through one or more edge transport nodes. The north-south traffic and edge nodes are described in more detail below by reference to FIGS. 7A-7B.

As shown, FIG. 6B includes three host machines 650-652 and the diagnostic tool 655. Each of the host machines executes a managed forwarding element and hosts a set of virtual machines. Specifically, the host machine 650 executes the MFE 660 and hosts the VM 620, along with several other VMs (e.g., some or all of which belong to the same tenant or other tenants of the hosting system). The host machine 651 executes the MFE 661 and hosts the VM 625 along with other VMs, while the host machine 652 executes the MFE 662 and hosts the VM 630 among several other VMs. The host machines communicate with the diagnostic tool 655 through their MFEs. Each MFE sends the different states of an LNE (e.g., realized and discovered states) to the diagnostic tool upon receiving a request for such from the diagnostic tool.

In some embodiments each MFE implements the logical switch 615 and the logical firewall 635. That is, each MFE operating on the hypervisor of a host machine receives the network packets that are destined for or sent from the VMs that operate on the host machine, and performs the logical forwarding processing (e.g., L2 processing) for the logical switch 615. The MFE also implements the logical firewall 635 by applying the logical forwarding policies of the logical firewall to the received packets. Although the distributed logical firewall 635 shown in this figure is implemented by the MFEs, in some embodiments, a logical middlebox such as the logical firewall 635 is a separate module (e.g., software module) that also executes on a virtualization software (e.g., hypervisor) of the host machine along with the MFE. Each middlebox module of some such embodiments executes in the hypervisor of a host machine and applies one or more network policies to the packets through the MFE that performs the forwarding processing on the packets.

As described above, the virtualization software of each host machine also executes a local controller (not shown) in some embodiments. Each local controller receives the configuration data (e.g., from the master manager) that defines forwarding behaviors of a set of LFEs and converts this data to customized configuration data that defines forwarding behaviors of the MFE that is associated with the local controller and that implements the set of LFEs. The MFE then generates customized forwarding data (i.e., the discovered state data) from the customized configuration data in order to forward the network traffic. In some other embodiments, the master controller generates the configuration data for each particular MFE and pushes the configuration data to the MFEs directly (without employing local controllers).

In some embodiments, The customized forwarding data generated for each MFE includes, but is not limited to, (1) forwarding data for the MFE to implement the required set of LFEs for packets sent to and received from the DCNs (e.g., L2 forwarding data such as MAC address resolution protocol (ARP) tables and logical ports associated MAC address tables, L3 data such as routing tables, etc.), and (2) forwarding data in order to encapsulate these packets using a tunnel protocol in order to send the packets to other MFEs (e.g., virtual tunnel endpoint (VTEP) tables, logical network and logical port identifier tables, etc.).

The logical forwarding data for implementing the LFEs of some embodiments includes tables that map addresses to logical ports of the LFEs (e.g., mapping MAC addresses of virtual machines 620-630 to logical ports of logical switch 615, mapping IP subnets to ports of logical routers (not shown), etc.), routing tables for logical routers, etc. Additionally, the logical forwarding data in some embodiments includes data for mapping of the logical ports of the LFEs to physical ports of the MFEs, to which the machines connected to a logical port connect. As described above, in some embodiments, the local controller converts the received logical network data into a set of addressing data to match against the header of a packet, and forwarding rules to apply on the packet when a match is found.

The tunneling data, in some embodiments, includes instructions on how to set up tunnels between the different MFEs (software and hardware). For instance, each of the MFEs 660-662 serves as a tunnel endpoint with a particular tunnel endpoint Internet Protocol (IP) address. Each MFE also receives, from the translated state stored in the master controller, addresses (e.g., tunnel endpoint IP addresses) of the other MFEs, as well as other information (e.g., logical network and logical port identifiers, etc.) to use when encapsulating packets using the tunnel protocol.

The top half of the illustrated example shows the physical LNEs (highlighted) on the east-west logical path that are diagnosed in (i.e., the discovered and realized states of which are inquired from) both MFEs 660 and 661. The bottom half shows the logical west-east path diagnosis also by highlighting the LNEs that are inspected in the MFEs 660 and 661. As shown, none of the states of the LNEs is inspected in the MFE 662, even though this MFE also implements the logical switch and logical firewall for the logical network (since the host machine 652 hosts VM3 which is also connected to the logical switch 615). This is because currently, the diagnostic tool is only inspecting the logical path between VM1 and VM2 (e.g., based on a diagnosis request for a communication failure between these two DCNs).

The diagnostic tool, based on the desired and translated states of the logical switch, realizes that the logical port LP1 of the logical switch is mapped to a physical port of the MFE 660 which is associated with the VNIC1 of the virtual machine VM1. In other words, the diagnostic tool identifies that MFE 660 is the transport node that receives a packet sent by an application running in VM 620, and performs the first hop forwarding processing for the logical switch 615 on the packet. This is because the desired and translated states data indicates to the tool that the virtual NIC of the VM 620 is connected to the logical port LP1 of the logical switch and therefore the physical span of the logical switch for this logical path is the transport node MFE1. As such, MFE 660 is also the source tunnel endpoint for transmitting the packet to the destination VM (i.e., VM2).

Additionally, the diagnostic tool identifies the destination tunnel endpoint (or transport node) for the packets that are sent from VM1 to VM2 as the MFE 661 also based on the desired and translated states stored in the master manager and controller of the logical switch. Such identification is based on, for example, the desired state data showing that logical port LP2 of the logical switch is connected to the virtual NIC of VM2, and the translated state data showing that the logical port LP2 is mapped to a physical port of MFE2 that is associated with the virtual NIC of VM2.

After identifying the transport nodes that implement the logical switch and the different logical ports of the logical switch on the east-west path, as well as identifying the different logical services that the logical ports receive, the diagnostic tool starts analyzing each of the LNEs (as highlighted in the figure) on this path one by one in the same manner that was described above by reference to FIGS. 4 and 5. For example, the diagnostic tool receives the discovered and realized states of the logical switch 615, the logical port LP1 of the logical switch, and the logical firewall instance 640 of the logical firewall that applies the firewall policy to LP1 from the transport node MFE1.

The diagnostic tool also receives the discovered and realized states of the logical switch 615 and the logical port LP2 of the logical switch from the transport node MFE2 that executes in the host machine 651. The diagnostic tool of some embodiments also receives the different states data of the VM1, VNIC1, and source and destination VTEPs from the transport node 660, and the different states data of the VM2 and VNIC2 from the transport node 661 in the east-west path analysis.

The diagnostic tool then compares the received realized and discovered states data with the desired state data stored in the mater manager of these LNEs (e.g., the master manager of the logical network) and the translated state data stored in the master controller of the LNEs (e.g., the master controller of the logical network). When the diagnostic tool 655 identifies any inconsistency between the compared data, the diagnostic tool reports the LNE for which the inconsistency is identified as a problematic LNE along with the corresponding transport node that implements or associates with the problematic LNE and the master manager and controller of the LNE.

After diagnosing the east-west logical path, as stated above, the diagnostic tool of some embodiments diagnoses the same logical path in an opposite direction (i.e., the west-east path). The bottom half of the FIG. 6B shows the physical LNEs (highlighted) on the west-east logical path that are diagnosed in both MFEs 660 and 661 on this path. The diagnostic tool, based on the desired and translated states of the logical switch, realizes that the logical port LP2 of the logical switch is mapped to a physical port of the MFE 661, which is associated with the physical port (i.e., VNIC2) of the virtual machine VM2.

In other words, the diagnostic tool identifies that MFE 661 is the transport node that receives a packet sent by an application running in VM 625, and performs the first hop forwarding processing for the logical switch 615 on the packet. This is because the desired and translated states data indicates that VNIC2 of VM2 is connected to the logical port LP2 of the logical switch and therefore the physical span of the logical switch for this logical path is the transport node MFE2. As such, MFE 661 is also the source VTEP for transmitting the packet to the destination VM (i.e., VM1) through a tunnel (e.g., VXLAN tunnel, STT tunnel, Geneve tunnel, etc).

Additionally, the diagnostic tool identifies the destination tunnel endpoint (or transport node) for the packets that are sent from VM2 to VM1 as the MFE 660 also based on the desired and translated states stored in the master manager and controller of the logical switch. Such identification is based on, for example, the desired state data showing that logical port LP1 of the logical switch is connected to the virtual NIC of VM1, and the translated state data showing that the logical port LP1 is mapped to a physical port of MFE1 that is associated with the virtual NIC of VM1 (i.e., VNIC1).

The diagnostic tool receives the discovered and realized states of the logical switch 615, the logical port LP2 of the logical switch, and the logical firewall instance 640 of the logical firewall that applies the firewall policy to LP2 from MFE 661 (i.e., the transport node MFE2). The diagnostic tool also receives the discovered and realized states of the logical switch 615 and the logical port LP1 of the logical switch from MFE 660 (i.e., the transport node MFE1) that executes in the host machine 650. Additionally, the diagnostic tool receives the discovered and realized states of the source and destination VTEPs from the MFE 661 in the west-east logical path diagnosis.

The diagnostic tool 655 then compares the received realized and discovered states data with the desired state data stored in the mater manager of these LNEs and the translated state data stored in the master controller of the LNEs. When the diagnostic tool identifies any inconsistency between the compared data (e.g., a MAC table record in the translated state of the logical switch does not match the same MAC table record in the discovered state of the logical switch), the diagnostic tool reports the LNE for which the inconsistency is identified as a problematic LNE along with the corresponding transport node that implements or associates with the problematic LNE and the master manager and controller of the LNE.

As described above the management plane receives a definition of a logical network and generates configuration data that defines the different logical forwarding entities of the logical network. One of the logical forwarding entities in a logical network is a distributed logical router. The management plane of some embodiments receives a definition of a logical router (e.g., through an API call) and defines a distributed logical router that includes several routing components. Each of these routing components is separately assigned a set of routes and a set of logical interfaces (ports).

Each logical interface of each routing component is also assigned a network layer (e.g., Internet Protocol or IP) address and a data link layer (e.g., media access control or MAC) address. In some embodiments, the several routing components defined for a logical router include a single distributed router (also referred to as distributed routing component) and several different service routers (also referred to as service routing components). In addition, the management plane of some embodiments defines a transit logical switch (TLS) for handling communications between the components internal to the logical router (i.e., between the distributed router and the service routers).

Some embodiments implement the distributed routing component of the logical router in a distributed manner across the different transport nodes in a same manner that a logical L2 switch (e.g., logical switch 615 in FIGS. 6A-6B spans the different transport nodes. The transport nodes on which the distributed router is implemented includes software MFEs that operate on the hypervisors of the host machines, as well as other hardware VTEPs (e.g., third-party TOR switches). Some embodiments implement each of the service routing components of the logical network on an edge node (e.g., a gateway), which is a machine at the edge of the network (e.g., the datacenter network) in some embodiments, in order to communicate with one or more external networks. Each of the service components has an uplink interface for communicating with an external network as well as a TLS interface for connecting to the transit logical switch and communicating the network data with the distributed routing component of the logical router that is also connected to the TLS.

The service components of a logical router, in some embodiments, may be configured in active-active or active-standby mode. In active-active mode, all of the service components are fully functional at the same time, and traffic can ingress or egress from the logical network through the service components using equal-cost multi-path (ECMP) forwarding principles (balancing the traffic across the various service routing components). In this mode, each logical interface of each separate service component has unique IP and MAC addresses for communicating with an external network and/or with the distributed component (through the transit logical switch).

In some embodiments, the logical router is part of a two-tier logical network structure. The two-tier structure of some embodiments includes (1) a single logical router (referred to as a provider logical router (PLR) and administrated by, e.g., the owner of the datacenter) for connecting the logical network to a network external to the datacenter, and (2) multiple logical routers (each referred to as a tenant logical router (TLR) and administrated by, e.g., different tenants of the datacenter) that connect to the PLR and do not separately communicate with the external network. In some embodiments, the management plane defines a transit logical switch between the distributed component of the PLR and the service components of the TLR.

Some embodiments provide other types of logical router implementations in a physical network (e.g., a datacenter network) such as a centralized logical router. In a centralized logical router, L3 logical routing functionalities are performed in only gateway machines, and the management plane of some embodiments does not define any distributed routing component and instead only defines multiple service routing components, each of which is implemented in a separate gateway machine. Different types of logical routers (e.g., distributed logical router, multi-layer logical routers, centralized logical router, etc.) and implementation of the different types of logical routers on edge nodes and managed forwarding elements operating on host machines of a datacenter are described in greater detail in the U.S. patent application Ser. No. 14/814,473, filed Jul. 30, 2015.

Logical routers, in some embodiments, can be viewed from three different perspectives. The first of these views is the API view, or configuration view, which is how the user (e.g., a datacenter provider or tenant) views and defines the logical router. The second view is the management plane (or control plane) view, which is how the CMP cluster (e.g., a master manager in the CMP cluster) internally defines the logical router. Finally, the third view is the physical realization, or implementation of the logical router, which is how the logical router is actually implemented in the physical network (e.g., a hosting system network infrastructure).

Figure 7A:
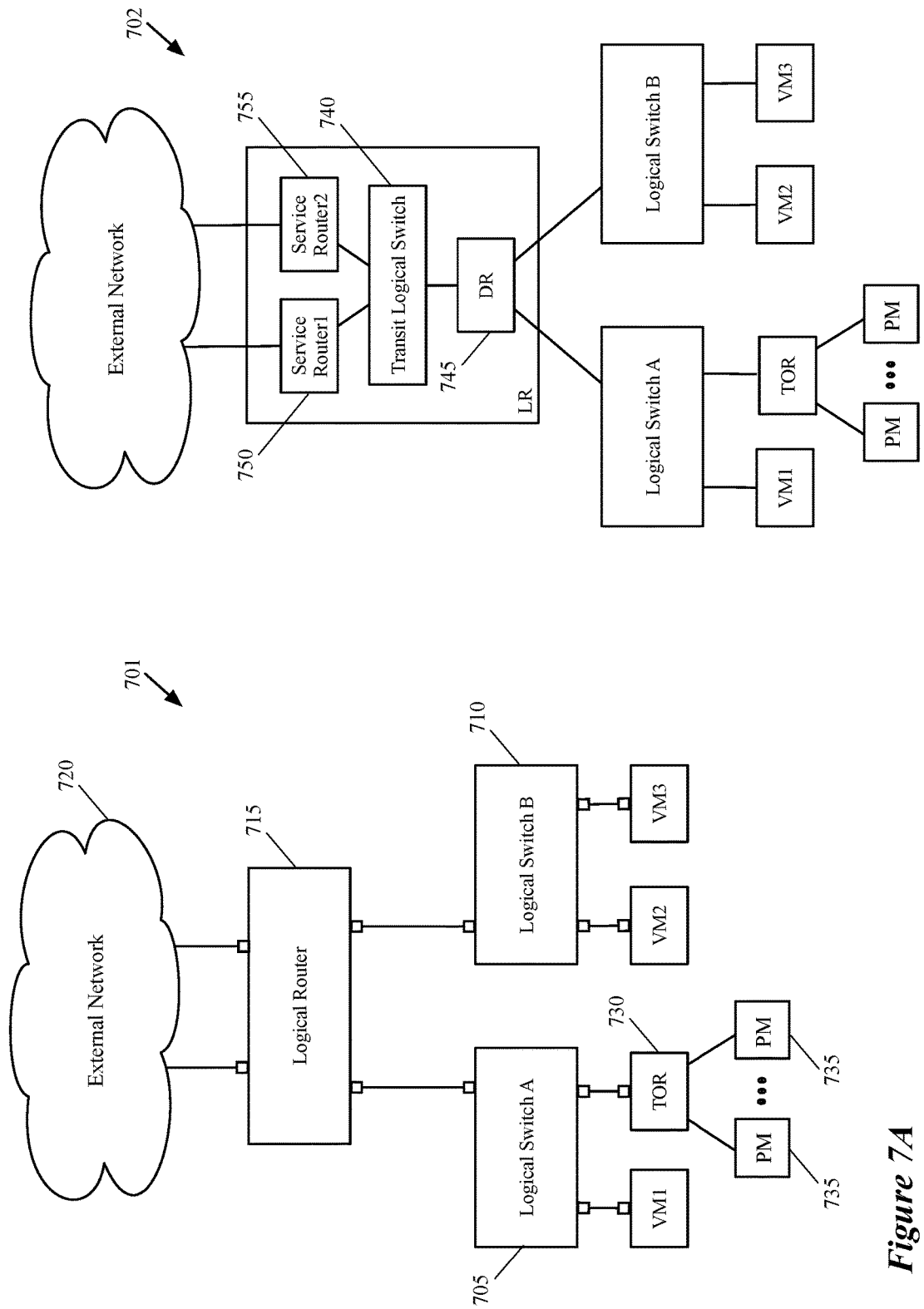
FIGS. 7A-7B illustrate different views of a distributed logical router in a logical network that logically connects different virtual and physical end machines to each other through different software and hardware transport nodes.
Figure 7B:
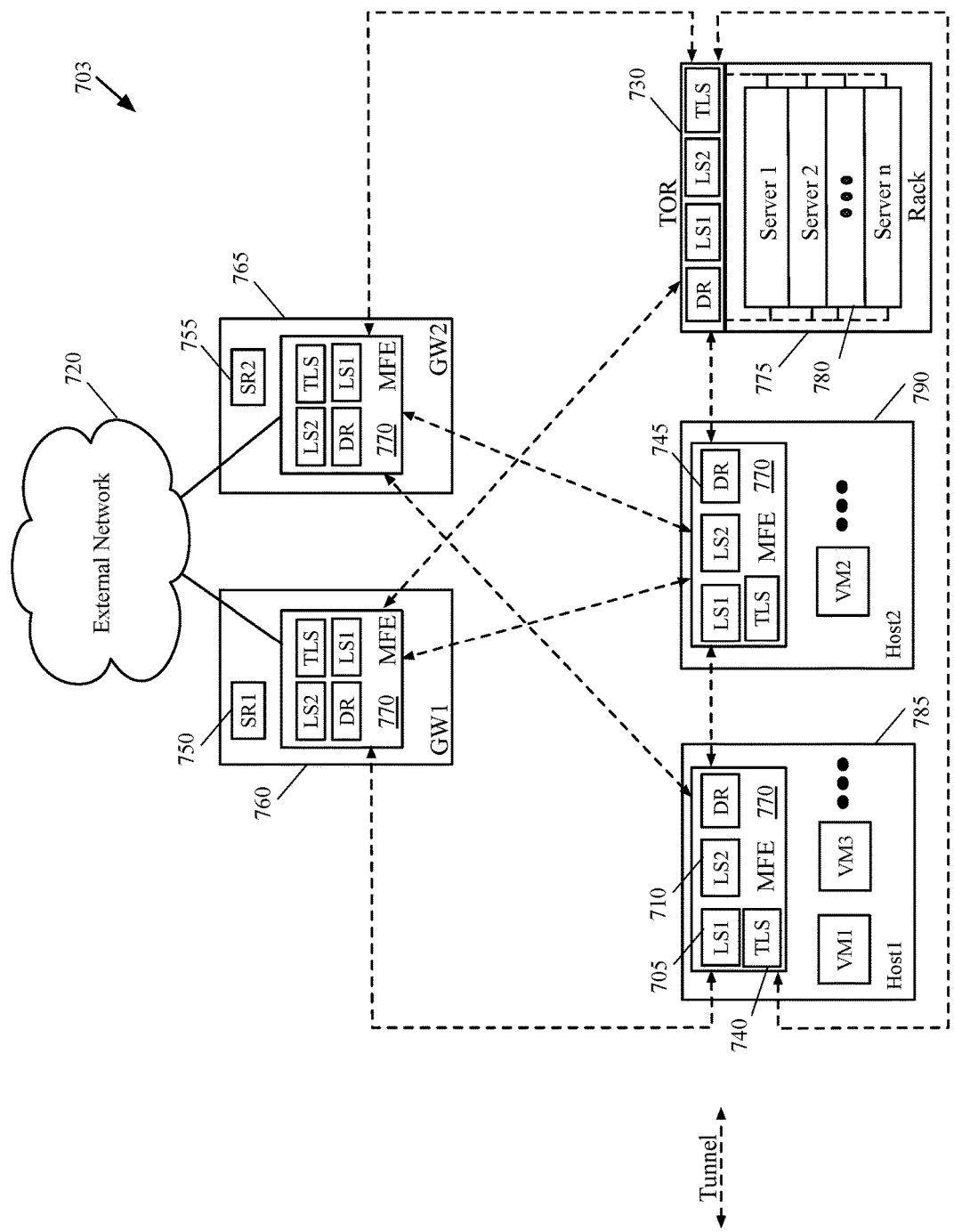

FIGS. 7A-7B illustrate different views of a distributed logical router in a logical network that logically connects different virtual and physical end machines (DCNs) to each other through different software and hardware transport nodes. More specifically FIG. 7A illustrates the configuration and management (control) plane views of the distributed logical router in a logical network, while FIG. 7B illustrates the physical distributed implementation of the logical router in the logical network.

The left hand side of FIG. 7A illustrates a logical network 701 that includes a logical router 715 and two other logical switches 705 and 710. The logical router 715 has two logical ports that are connected to the logical switches 705 and 710. Logical switch 705 has logical ports that are connected to a virtual machine VM1 and a TOR switch 730, while the logical switch 710 has logical ports connected to the virtual machines VM2 and VM3. The logical router 715 also includes two logical ports that connect to the external physical network 720. The TOR switch 730 connects a set of physical machines 735 (e.g., physical servers, host machines, physical computers, printers, etc.) to the VMs in the logical network 701 through the logical switches 705 and 710, and the logical router 715. In some embodiments, the TOR switch 730 is a third-party top of rack switch while the physical machines 735 are the host machines of the same or different hosting systems.

As stated before, while shown as VMs in this figure and other figures below, it should be understood that other types of data compute nodes (e.g., namespaces, containers, etc.) may connect to logical forwarding elements (e.g., logical switches 705 and 710, or logical router 715) in some embodiments. It should also be understood that although in the example figures the hardware transport node is shown as a TOR switch, the hardware transport node can be any other third-party hardware forwarding element (e.g., other physical switches and routers, appliances such as firewalls, load balancers, etc.). Additionally, one of ordinary skill in the art would realize that many more VMs and TOR switches (or other third-party hardware switches) may connect to a logical network such as the illustrated logical network. The illustrated example includes only one TOR switch and three VMs in order to simplify the figure and its description.

The right hand side of FIG. 7A illustrates a management (control) plane view 702 of the logical network 701 that is shown in the left hand side of the figure. The management plane view 701 for the distributed implementation illustrates that the management plane, after receiving the definition of the logical router, creates a distributed router 745, two service routers 750 and 755, and a transit logical switch 740 based on the received logical router definition.

In some embodiments, the management plane generates separate routing information bases (RIBs) and/or forwarding information bases (FIBs) for each of the routing components 745-755. That is, in addition to having separate objects created in the management/control plane, each of the routing components is treated as a separate router with separate routing tables. The transit logical switch 740 has different logical ports for each of the routing components 745-755 and each of these routing components has an interface to logically connect to the transit logical switch 740.

FIG. 7B illustrates the physical distributed implementation of the logical router 715 of FIG. 7A. More specifically, this figure shows a physical implementation 702 of the logical router that includes two gateway machines 760 and 765, two host machines 785 and 790, and a rack 775. Each of the MFEs operating on the gateway and host machines is a transport node that implements the LFEs of the logical network. Similarly, the TOR switch 730 is also is a transport node that implements the LFEs of the logical network.

The two gateway machines 760 and 765 are connected to the external network 720. The gateway machines are also connected to the host machines 785 and 790, as well as the rack 775. Each host machine hosts a set of end machines and executes an MFE 770. Each of the gateway machines also executes an MFE 770, as well as a service router instance (i.e., SRs 750 and 755). The rack 775 includes a set of servers 780 (e.g., host machines, physical computers, etc.) as well as the TOR switch 730.

As shown, the virtual machines VM1 and VM3, which couple to the logical switches 705 (LS1) and 710 (LS2), respectively, in the logical network 701, operate on the host machine 785, while the virtual machine VM2 that couples to the logical switch 710 operates on the host machine 790. Although, in the illustrated example two end machines that are connected to the same logical port are hosted by two different host machines, two or more end machines that are connected to a same logical switch might as well operate on the same host machine. The TOR switch 730 that couples to the logical switch 710 is part of the rack 775, which also includes a set of servers 780 that are connected to the TOR switch 730. In some embodiments, the rack 775 is a hosting system rack and the servers 780 are host machines of the hosting system. The virtual machines VM1-VM3 and servers 780 communicate (e.g., exchange network data) with each other and other network elements via the logical network 701.

Each host machine executes a managed forwarding element (MFE) 770. In some embodiments, the MFEs 770 operating on the host machines are physical software switches provided by the hypervisors or other virtualization software on the host machines. These MFEs perform the entire first-hop forwarding processing for the logical switches 705 and 710 on packets that are received from the virtual machines VM1-VM3 of the logical network 701 (unless the pipeline of the transit logical switch 740 of the MFE specifies to send the packet to a SR). The MFEs residing on the host machines Host 1 and Host 2 may also implement logical switches (and distributed logical routers) for other logical networks if the other logical networks have VMs that reside on the host machines Host 1 and Host 2 as well.

Similarly, the TOR switch 730 performs the entire first-hop processing for the logical switches 105 and 110 for packets sent by the physical machines 735. Therefore, as shown, all the MFEs 770 and the TOR switch 730 implement the logical switches LS1 and LS2, as well as the DR 745 and the TLS 740. As described above, the MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

In some embodiments, when the MFE receives a packet from a VM that is coupled to the MFE, it performs the processing for the logical switch to which that VM logically couples, as well as the processing for any additional logical forwarding elements (e.g., logical router processing if the packet is sent to an external network, logical router processing and processing for the other logical switch in the network if the packet is sent to an end machine coupled to the other logical switch, etc.). The management plane distributes the logical forwarding data of the L2 logical switches 705 and 710 to the MFEs 770 and TOR switch 730 in order for the transport nodes to implement these logical switches. Additionally the management plane distributes the logical forwarding data of the logical routing components to the transport nodes in order for the transport nodes to implement the logical router and connect the physical workload attached to the TOR switch 730 to the virtual machines VM1-VM3.

In some embodiments, the management and control plane distribute the logical forwarding data of the logical forwarding elements directly to the TOR switch 730 using an open source database protocol such as OVSDB protocol. In some other embodiments the management and control plane distribute the forwarding data first to one or more hardware VTEP controllers using the NETCPA protocol, which is a proprietary protocol (a VXLAN control plane protocol). In some such embodiments, the hardware VTEP controllers subsequently translate the logical forwarding data to the open source protocol (e.g., OVSDB protocol) that is recognizable by the TOR switch 730 and distribute the forwarding data to the TOR switch using the open source protocol.

The distributed router 745 and TLS 740, as shown in FIG. 7B, are implemented across the MFEs 770, the gateway machines 760 and 765, and the TOR switch 730 (e.g., in the same manner that the other logical switches are implemented). That is, the datapaths (e.g., in the MFEs 770, or in a different form factor on the gateways and TOR switch) all include the necessary processing pipelines for the DR 745 and the TLS 740. Unlike the distributed router 745, each of the two service routers 750 and 755 operates on a single gateway machine. Specifically, the SR 750 shown in the figure operates on the gateway machine 760, while the SR 755 operates on the gateway machine 765.

In some embodiments, the gateway machines 760 and 755 (also called edge nodes in some embodiments) are host machines, which host service routers rather than user VMs. As shown in the figure, each of the gateway machines includes an MFE 770 as well, which are similar to the other MFEs operating on the other host machines that implement the logical forwarding elements of the logical network 701. In the illustrated gateway machines 760 and 755, the service routers are shown as separate modules from the MFEs that operate on the gateway machines. Different embodiments, however, may implement the SRs differently.

Some embodiments implement the SRs as VMs (e.g., when the MFE is a software switch integrated into the virtualization software of the gateway machine), in which case the SR processing is performed outside of the MFE. Additionally, some embodiments implement the SRs on an edge MHFE (e.g., a hardware VTEP). In some such embodiments, the edge hardware VTEP plays the role of a gateway machine and connects the logical network (also implemented by the VTEP) to external network(s).

On the other hand, some embodiments implement the SRs as virtual routing and forwarding (VRFs) elements within the MFE datapath (when the MFE uses DPDK for the datapath processing). In either case, the MFE treats the SR as part of the datapath, but in the case of the SR being a VM (or other data compute node) separate from the MFE, the MFE sends the packet to the SR for processing by the SR pipeline (which may include the performance of various services). As with the MFEs on the host machines Host 1 and Host 2, the MFEs of the gateway machines, as described above, are configured to perform all of the distributed processing components of the logical network.

As described above, the different MFEs and TOR switch that implement the logical forwarding elements use a tunnel protocol in order to exchange the network data between the different elements of the logical network 701. In some embodiments, the management plane (e.g., a master manager of the CMP cluster) distributes configuration data to the MFEs and TOR switch (e.g., through separate controllers of MFEs and TOR switch), which includes forwarding data that defines how to set up tunnels between the MFEs (hardware and software).

For instance, the configuration data specifies the location (e.g., IP address) of each MFE as a tunnel endpoint (i.e., a software or hardware VTEP). The different hardware and software MFEs receive the tunnel endpoint addresses of the other MFEs that implement the logical forwarding elements from the CCP cluster (e.g., as part of the translated state) and store these addresses in the MFEs' corresponding VTEP tables. The MFEs then use these VTEP tables to establish tunnels between each other. That is, each source VTEP uses its corresponding VTEP table data to encapsulate the packets received form a source VM using a particular tunnel protocol (e.g., VXLAN protocol), and forwards the packets towards the destination VTEP. The destination VTEP then decapsulates the packets using the same particular tunnel protocol and forwards the packets towards a destination VM.

Figure 8A:
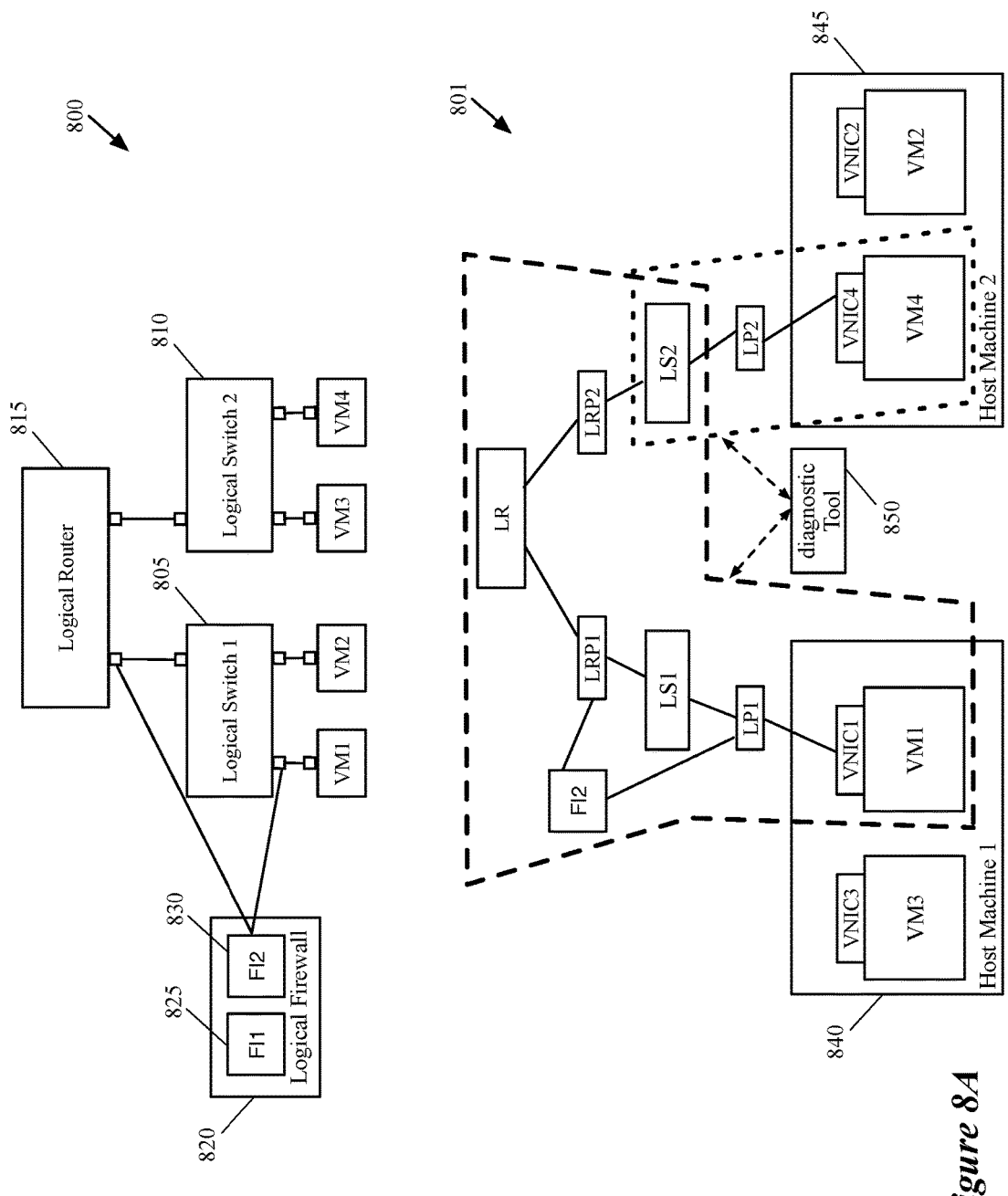
FIGS. 8A-8B illustrate an example of diagnosing a logical path that includes several logical forwarding elements including a logical router.
Figure 8B:
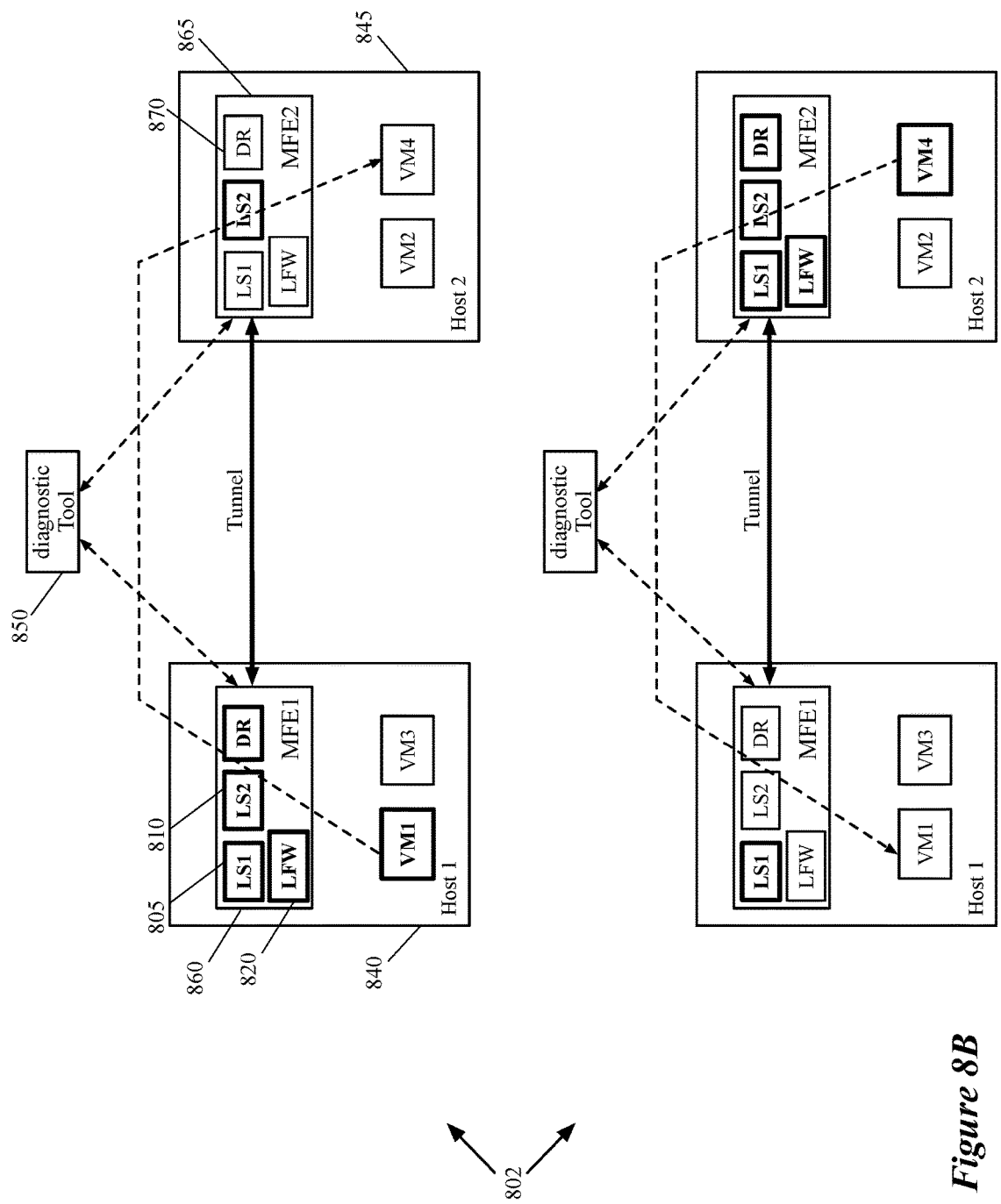

FIGS. 8A-8B illustrate an example of diagnosing a logical path that includes several logical forwarding elements including a logical router. The figures show how the LFEs, which logically connect four different DCNs running on two different host machines, are diagnosed in some embodiments. The top half of FIG. 8A shows a logical network portion 800, and the bottom half shows a physical network portion 801 that includes the logical network entities (LNEs) that are involved in a logical path between two of the DCNs. The logical network portion 800 includes a logical router 815 and two other logical switches 805 and 810. The logical router 815 has two logical ports that are connected to the logical switches 805 and 810. Logical switch 805 has logical ports that are connected to the virtual machines VM1 and VM2, while the logical switch 810 has logical ports connected to the virtual machines VM3 and VM4. The logical router 815 shown in this figure does not include any logical ports that connect to an external network.

The logical network portion 800 also includes a logical firewall 820 that includes two firewall instances 825 and 830. Each of these firewall instances applies a firewall policy to one or more logical ports of the logical router in some embodiments. In the illustrated example, the logical firewall 820 applies a firewall policy to the first logical port LP1 of the logical switch 805 and the first logical port LRP1 of the logical router 815 through the firewall instance 830. The virtual machines VM1 and VM2 are logically connected to the logical ports of the logical switch 805 (e.g., through their VNICs), while VM3 and VM4 are logically connected to the logical ports of the logical switch 810.

The physical network portion 801, shown in the bottom half of the figure, includes two separate host machines 840 and 845 (e.g., of a hosting system). The host machine 840 hosts VM1 and VM3, while the host machine 845 hosts VM3 and VM4. As such, the different logical network entities that are involved in a logical path between the virtual machines VM1 and VM4 include VM1, VNIC1, logical switch port LP1, logical switch LS1, logical router port LRP1, logical router LR, logical router port LRP2, logical switch LS2, logical switch port LP2, VNIC4, and finally VM4. Also, firewall instance FI2 that applies the firewall policy to LP1 and LRP1, and the source and destination VTEPs (not shown) are also involved in the logical path (that has indicated a communication issue).

As will be described in more detail below by reference to FIG. 8B, the different states of these LNEs are received from a different transport node depending on which directional logical path is being diagnosed. For instance, in an east-west diagnosis, the LNEs VM1, VNIC1, LP1, LS1, LRP1, LR, LRP2, and LS2 are either associated with or implemented by a transport node that executes on the host machine 840, while the LNEs VM4, VNIC4, and LP4 are either associated with or implemented by a transport node that executes on the host machine 845. Additionally, the different states of the source and destination VTEPs are received from the transport node of the host machine 840 in the east-west diagnosis. The bottom half of FIG. 8A also shows a diagnosis tool 850 that receives the different states of each of these LNEs from either the transport node that operates on the host machine 840, or the transport node that operates on the host machine 845.

FIG. 8B illustrates a physical network 802 that implements the logical network portion 800. The top half of this figure shows the logical network entities that are diagnosed on an east-west logical path from the source VM1 to the destination VM4. The diagnosed network elements include the LNEs on the logical path, through which a packet has to pass in order to be transmitted from VM1 to VM4. The bottom half of the figure shows the same LNEs, except that the LNEs are now diagnosed on an opposite directional path (i.e., the west-east logical path) from the source VM4 to the destination VM1.

The diagnosed network elements in the west-east path include the same LNEs, through which a packet has to pass in order to be transmitted from the source VM4 to the destination VM1. However, when an LNE spans multiple transport nodes, the transport node from which the different states of the LNE are received, differs from one directional path (e.g., the east-west path) to another directional path (e.g., the west-east path). For example, in some embodiments, in each directional path, the different states (e.g., discovered and realized states) of all the LFEs, along with the logical ports of the LFEs and the logical services that the LFEs receive, are received from a source transport node that implements the LFEs (and logical services) except the logical port that is connected to the destination DCN. In some such embodiments, the different states of the logical port that is connected to the destination DCN, along with the LFE that includes the logical port (e.g., the destination logical switch) are received from a destination transport node (that implements the destination logical switch and its corresponding logical port).

As shown, FIG. 8B includes two host machines 840-845 and the diagnostic tool 850. Each of the host machines executes a managed forwarding element and hosts a set of virtual machines. Specifically, the host machine 840 executes the MFE 860 and hosts the virtual machines VM1 and VM3 (along with other VMs). The host machine 845 executes the MFE 865 and hosts the virtual machines VM2 and VM4 (along with other VMs). The host machines communicate with the diagnostic tool 850 through their MFEs. Each MFE sends the different states of an LNE (e.g., realized and discovered states) to the diagnostic tool upon receiving a request for such from the diagnostic tool.

In some embodiments each of the MFEs implements the logical router 815 by implementing (i.e., performing routing functionalities of) the distributed routing component (i.e., DR 870) of the logical router. It is important to note that although the logical router 815 also includes a transit logical switch (TLS) that is implemented by each MFE in the same manner as the DR, the TLS is not shown in this figure. This is because the logical path that is diagnosed in this figure is an east-west logical path. In other words, the network traffic in the illustrated example stays within the hosting system and is not sent to any external logical or physical networks. As such, the TLS of the logical router that connects the distributed router (DR) to one or more service routers (SRs) that are connected to external network(s) is not involved in the diagnosed logical path.

Each MFE also implements the logical switches 805 and 810, as well as the logical firewall 820 (including the logical firewall instance that applies the firewall policy to the logical ports of the logical switch and logical router). As described above, implementing the LFEs by each MFE includes receiving the network packets that are destined for or sent from the VMs that operate on the host machine that executes the MFE, and performing the logical forwarding processing (e.g., L2 and L3 processing) for the LFEs. Each MFE also implements the logical firewall 820 by applying the logical forwarding policies of the logical firewall to the received packets. Also, as described before, the distributed logical firewall 820 shown to be implemented by the MFEs in this figure, in some embodiments, is a separate module (e.g., software module) that also executes on a virtualization software (e.g., hypervisor) of the host machine along with the MFE and communicates with the MFE in the hypervisor to apply one or more firewall policies to the network traffic.

The top half of the illustrated example shows the physical LNEs (highlighted) on the east-west logical path that are diagnosed in (i.e., the discovered and realized states of which are inquired from) both MFEs 860 and 865. The bottom half shows the logical west-east path diagnosis also by highlighting the LNEs that are inspected (i.e., diagnosed) in the MFEs 860 and 865. In the illustrated example, the diagnostic tool 850 has received a request to diagnose this logical path based on a communication error between the virtual machines VM1 and VM4. The diagnostic tool might have also received a request to diagnose the logical router 815 or one of the logical switches 805 and 810. Upon receiving such a request, as described above by reference to FIG. 4, the diagnostic tool has first identified the different logical paths that include the LFE, and then started to diagnose each identified logical path one by one between the different pairs of the VMs. The illustrated logical path is one of those identified logical paths that include the requested LFE (e.g., the logical router).

The diagnostic tool 850, based on the desired and translated states of the logical switch that is connected to VM1, identifies that MFE 860 is the transport node that performs the first hop forwarding processing for the LFEs on the packets received from VM1 in the east-west traffic. As such, MFE 860 is also the source VTEP for transmitting the packets to the destination VM (i.e., VM4). Additionally, the diagnostic tool identifies the destination tunnel endpoint (or transport node) for the packets that are sent from VM1 to VM4 as the MFE 865 also based on the desired and translated states stored in the master manager and controller of the LFEs.

Such identification is based on, for example, the desired state data showing that a logical port of the logical switch 805 (not shown) is associated with the logical port LRP1 of the DR 870, while the logical port LRP2 of the DR is associated with a logical port of the logical switch 810 (not shown). The desired state data also indicates that the logical port LP2 of the logical switch 810 is connected to the virtual NIC of VM4 (i.e., VNIC4). The translated state data, on the other hand, shows that the logical port LP2 of the logical switch 810 is mapped to a physical port of MFE 865 that is associated with VNIC4.

After identifying the transport nodes that implement the LFEs and the different logical ports of the LFEs on the east-west path, as well as identifying the logical services these logical ports receive, the diagnostic tool starts analyzing each of the LNEs (as highlighted in the figure) on this path one by one in the same manner that was described above by reference to FIGS. 4 and 5. For example, the diagnostic tool receives, from the transport node 860, the discovered and realized states of the distributed router 870, the logical port LRP1 of the DR, the logical switch 805 (LS1) and its logical port LP1, the logical firewall 820 and the logical firewall instance 830, and the logical switch 810 (LS2).

The diagnostic tool also receives the discovered and realized states of the logical switch 810 and the logical port LP2 of the logical switch LS2 from the transport node 865 that executes in the host machine 845. The diagnostic tool of some embodiments also receives the different states data of the VM1, VNIC1, and source and destination VTEPs from the transport node 860, and the different states data of the VM4 and VNIC4 from the transport node 865 in the east-west direction of the logical path.

The diagnostic tool then compares the received realized and discovered states data with the desired state data stored in the mater manager of these LNEs (e.g., the master manager of the logical network) and the translated state data stored in the master controller of the LNEs (e.g., the master controller of the logical network). When the diagnostic tool 850 identifies any inconsistency between the compared data, the diagnostic tool reports the LNE for which the inconsistency is identified as a problematic LNE along with the corresponding transport node that implements or associates with the problematic LNE and the master manager and controller of the LNE.

After diagnosing the east-west logical path, as stated above, the diagnostic tool of some embodiments diagnoses the same logical path in an opposite direction (i.e., the west-east path). The bottom half of the FIG. 8B shows the physical LNEs (highlighted) on the west-east logical path that are diagnosed in both MFEs 860 and 865 on this path. The diagnostic tool, based on the desired and translated states of the logical switch, identifies that the MFE 865 is the transport node that performs the first hop forwarding processing for the packets received form VM4 on this transport node. As such, the transport node 865 is also the source VTEP for transmitting the packets to the destination VM (i.e., VM1) through a tunnel (e.g., VXLAN tunnel, STT tunnel, Geneve tunnel, etc).

Additionally, the diagnostic tool identifies the destination tunnel endpoint for the packets that are sent from VM4 to VM1 as the MFE 860 also based on the desired and translated states stored in the master manager and controller of the logical switch that is connected to VM1. Such identification is based on, for example, the desired state data showing that a logical port of the logical switch 810 (not shown) is associated with the logical port LRP2 of the DR 870, while the logical port LRP1 of the DR is associated with a logical port of the logical switch 805 (not shown). The desired state data also indicates that the logical port LP1 of the logical switch 805 is connected to the virtual NIC of VM1 (i.e., VNIC1). The translated state data, on the other hand, shows that the logical port LP1 of the logical switch 805 is mapped to a physical port of MFE 860 that is associated with VNIC1.

The diagnostic tool 850 receives, from the transport node 865, the discovered and realized states of the distributed router 870, the logical port LRP2 of the DR, the logical switch 810 (LS1) and its logical port LP2, the logical firewall 820 and the logical firewall instance 830, and the logical switch 805 (LS1). The diagnostic tool also receives the discovered and realized states of the logical switch 805 and the logical port LP1 of the logical switch LS1 from the transport node 860 that executes in the host machine 840. The diagnostic tool of some embodiments also receives the different states data of the source and destination VTEPs from the transport node 865.

The diagnostic tool 850 then compares the received realized and discovered states data with the desired state data stored in the mater manager of these LNEs and the translated state data stored in the master controller of the LNEs. When the diagnostic tool identifies any inconsistency between the compared data (e.g., an FIB table record in the translated state of the logical router does not match the same FIB table record in the discovered state of the logical router), the diagnostic tool reports the LNE for which the inconsistency is identified as a problematic LNE along with the corresponding transport node that implements or associates with the problematic LNE and the master manager and controller of the LNE.

Figure 9A:
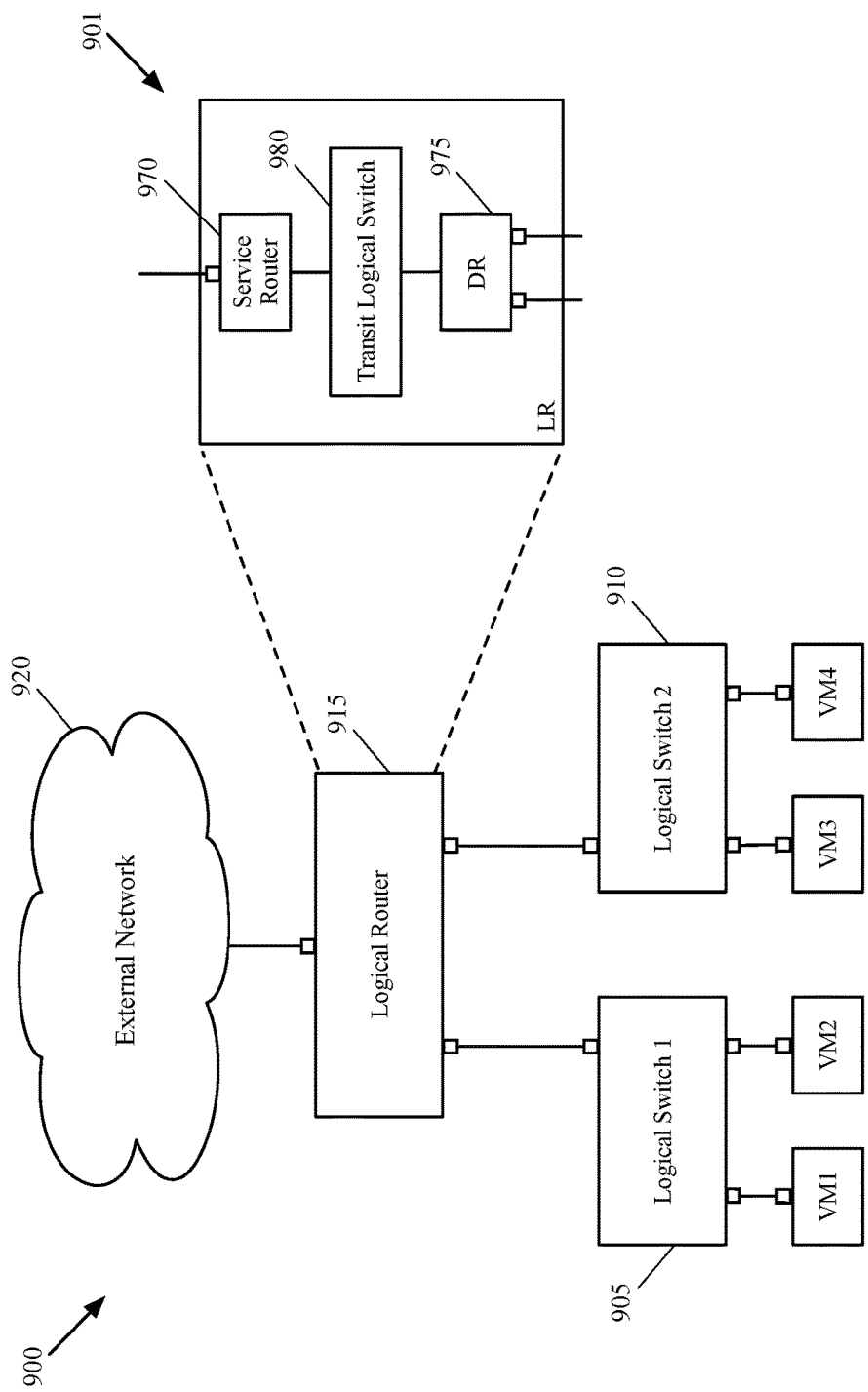
FIGS. 9A-9B illustrate an example of diagnosing a logical path that connects a logical network to an external network (e.g., a logical or physical network) through a service routing component of a logical router.
Figure 9B:
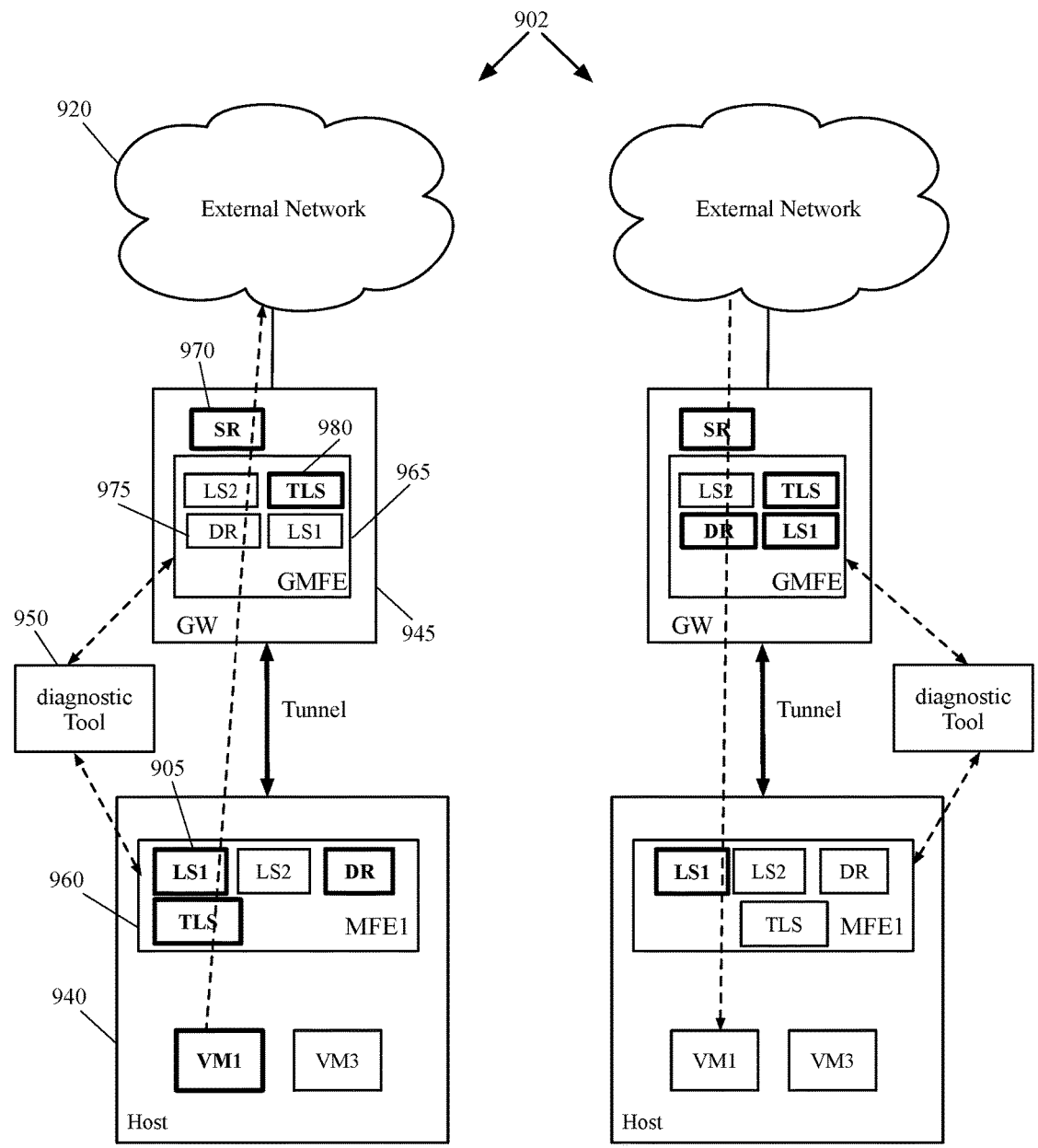

FIGS. 9A-9B illustrate an example of diagnosing a logical path that connects a logical network to an external network (e.g., a logical or physical network) through a service routing component of a logical router. The figures show how the LFEs, which logically connect a DCN running on a host machine, are diagnosed in some embodiments. FIG. 9A shows a logical network view 900 that includes a logical router 915 and two other logical switches 905 and 910. The logical router 815 has two logical ports that are connected to the logical switches 905 and 910. The logical switch 905 includes logical ports that are connected to the virtual machines VM1 and VM2, while the logical switch 910 has logical ports connected to the virtual machines VM3 and VM4. The logical router 915 also includes a logical port that is connected to an external network 920.

This figure also shows a management plane view 901 of the logical router 915 that includes a service router SR 970 that connects the logical router to the external network 920, a DR 975 that connect the logical router to the logical switches LS1 and LS2, and a TLS 980 that connects the SR 970 to the DR 975. The virtual machines VM1 and VM2 are logically connected to the first and second logical ports of the logical switch 905 (e.g., through their VNICs), while the virtual machines VM3 and VM4 are logically connected to the first and second logical ports of the logical switch 910. Although not shown in this figure, any of the three LFEs, or any logical port of any of the LFEs may also receive one or more logical services (e.g., from one or more logical middleboxes) in the same manner that was described for the above figures.

FIG. 9B illustrates a portion of a physical network view 902 that implements the logical network 900. The left hand side of this figure shows the logical network entities that are diagnosed on a south-north logical path from the source VM1 to a destination in an external network 920 (e.g., a physical next hop router to which the logical router 915 is coupled). The diagnosed logical network elements include the LNEs on the logical path, through which a packet has to pass in order to be transmitted from VM1 to the external network. The right hand side of the figure shows the same LNEs, except that the LNEs are now diagnosed on an opposite directional path (i.e., the north-south logical path) from the external network 920 to the destination VM1. As described above, when an LNE spans multiple transport nodes, the transport node from which the different states of the LNE are received, differs from one directional path (e.g., the south-north path) to another directional path (e.g., the north-south path).

As shown, each physical network view 902 includes a host machine 940, a gateway machine 945, and a diagnostic tool 950. Because the logical network communicates with an external network in the illustrated example, a transport node that operates on a gateway machine connects the transport node that operates on the host machine to the external network. As such, the realized and discovered states of the different LNEs have to be retrieved from both host machine 940 and gateway machine 945.

Each of the host machine 940 and gateway machine 945 executes a managed forwarding element. Specifically, the host machine 940 executes the MFE 960 and hosts the virtual machines VM1 and VM3 (along with other VMs). The gateway machine 945 executes the MFE 965 as well as the service router 970 of the logical router 915. The host and gateway machines communicate with the diagnostic tool 950 through their MFEs. Each MFE sends the different states of an LNE (e.g., realized and discovered states) to the diagnostic tool upon receiving a request for such from the diagnostic tool.

In some embodiments each of the MFEs implements the logical router 915 by implementing (i.e., performing routing functionalities of) the distributed routing component (i.e., DR 975) of the logical router as well as the transit logical switch (i.e., TLS 980) of the logical router. It is important to note that unlike FIG. 8, in this figure the TLS is shown to be implemented on both of the host machines and the gateway machine. This is because the logical path that is diagnosed in this figure is a north-south logical path.

In other words, the network traffic in the illustrated example does not stay within the hosting system and is sent to and received from the external network 920. Because the TLS 980 of the logical router connects the DR 975 to the SR 970 which is connected to the external network (e.g., through the different logical ports of the TLS), both of the TLS 980 and the SR 970 are also diagnosed in this logical path. Furthermore, each MFE also implements the logical switches 905 and 910 in the same manner that was described above by reference to FIG. 8.

The left-hand side of the illustrated example shows the physical LNEs (highlighted) on the south-north logical path that are diagnosed in (i.e., the discovered and realized states of which are inquired from) both MFEs 960 and 965. The bottom half shows the logical west-east path diagnosis also by highlighting the LNEs that are inspected (i.e., diagnosed) in the MFEs 960 and 965 as well as SR module 970 that is not implemented by the MFE 965 but is executed by the gateway machine. In the illustrated example, the diagnostic tool 950 has received a request to diagnose this logical path based on a communication error between the virtual machine VM1 and the external network (e.g., a destination physical machine in the external network).

The diagnostic tool 950, based on the desired and translated states of the logical switch that is connected to VM1, identifies that MFE 960 is the transport node that performs the first hop forwarding processing for the LFEs on the packets received from VM1 in the south-north traffic. As such, MFE 960 is also the source VTEP for transmitting the packets to the SR 970. Additionally, the diagnostic tool identifies the destination tunnel endpoint (or transport node) for the packets that are sent from VM1 to SR as the MFE 965 also based on the desired and translated states stored in the master manager and controller of the LFEs.

Such identification is based on, for example, the desired state data showing that a logical port of the logical switch 905 is associated with a south interface of the DR 970, while a north interface of the DR is associated with a logical port of the TLS 980 which is also connected to the SR 970 through another logical port (as shown in the management plane view 901 of FIG. 9A). The translated state data, on the other hand, shows that the logical port of the transit logical switch 980 is mapped to a physical port of MFE 965 that is associated with the south interface of the SR 970.

After identifying the transport nodes that implement the LFEs and the different logical ports of the LFEs on the south-north path, the diagnostic tool starts analyzing each of the LNEs (as highlighted in the left-hand side of the figure) on this path one by one. For example, the diagnostic tool receives, from the transport node 960, the discovered and realized states of the logical switch 905 (LS1) and the logical port of LS1 that is connected to VM1, the distributed router 970, the south interface of the DR that is connected to LS1, the north interface of DR that is connected to the transit logical switch (TLS) 980, the TLS including the south interface of the TLS.

The diagnostic tool also receives the discovered and realized states of the north interface of the TLS 980 and the SR 970 including the north and south interfaces of the SR from the transport node 965 and the gateway machine 945. The diagnostic tool of some embodiments also receives the different states data of the VM1, VNIC1, and source and destination VTEPs from the transport node 960.

The diagnostic tool then compares the received realized and discovered states data with the desired state data stored in the mater manager of these LNEs (e.g., the master manager of the logical network) and the translated state data stored in the master controller of the LNEs (e.g., the master controller of the logical network). When the diagnostic tool 950 identifies any inconsistency between the compared data, the diagnostic tool reports the LNE for which the inconsistency is identified as a problematic LNE along with the corresponding transport node that implements or associates with the problematic LNE and the master manager and controller of the LNE.

After diagnosing the south-north logical path, as stated above, the diagnostic tool of some embodiments diagnoses the same logical path in an opposite direction (i.e., the north-south path). The right-hand side of the FIG. 9B shows the physical LNEs (highlighted) on the north-south logical path that are diagnosed in both MFEs 960 and 965 on this path. The diagnostic tool, based on the desired and translated states of the transit logical switch connected to the SR 970, identifies that the MFE 965 is the transport node that performs the first hop forwarding processing for the packets received form the external network on this transport node. As such, the transport node 965 is also the source VTEP for transmitting the packets to the destination VM (i.e., VM1) through a tunnel (e.g., VXLAN tunnel, STT tunnel, Geneve tunnel, etc).

In other words, when network traffic of a logical network is exchanged with an external network, a gateway machine that executes a service router of a distributed logical router includes the source transport node that performs the entire first hop forwarding processing for the packets received from an external network. That is, the source transport node, which implements a set of LFEs that logically connects the service router to the destination DCN, performs all the packet forwarding processing for the set of LFEs on the packets received from the external network.

Similarly, a host machine that executes a source DCN (e.g., a VM executing on the host machine) that sends network traffic to an external network, includes the source transport node that performs the entire first hop forwarding processing for the packets received from the source DCN. That is, the source transport node, which implements a set of LFEs that logically connects the source DCN to the external network (e.g., to a destination DCN in the external network), performs all the packet forwarding processing for the set of LFEs on the packets received from the source DCN.

Additionally, the diagnostic tool identifies the destination tunnel endpoint for the packets that are sent from the external network to VM1 as the MFE 960 also based on the desired and translated states stored in the master manager and controller of the logical switch that is connected to VM1. Such identification is based on, for example, the desired state data showing that a logical port of the TLS 980 is associated with a north interface of the DR 970, while anther logical port of the TLS is associated with a north interface of the DR 975 which is also connected to the logical switch 905 through the south interface of the DR (as shown in the management plane view 901 of FIG. 9A). The translated state data, on the other hand, shows that a logical port of the logical switch 905 is mapped to a physical port of MFE 960 that is associated with the logical port of the logical switch 905.

After identifying the transport nodes that implement the LFEs and the different logical ports of the LFEs on the north-south path, the diagnostic tool 950 starts analyzing each of the LNEs (as highlighted in the right-hand side of the figure) on this path one by one. For example, the diagnostic tool receives, from the transport node 965, the discovered and realized states of the SR 970 including the north and south interfaces of the SR that are connected to the external network and the TLS 980, respectively; the TLS 980 including the north and south logical ports of the TLS; the DR 975; and the logical switch 905 (LS1). The diagnostic tool also receives the discovered and realized states of LS1 and the logical port of LS1 that is connected to VM1 from the transport node 960 that operates on the host machine 940.

The diagnostic tool 950 then compares the received realized and discovered states data with the desired state data stored in the mater manager of these LNEs and the translated state data stored in the master controller of the LNEs. When the diagnostic tool identifies any inconsistency between the compared data (e.g., an FIB table record in the translated state of the logical router does not match the same FIB table record in the discovered state of the logical router), the diagnostic tool reports the LNE for which the inconsistency is identified as a problematic LNE along with the corresponding transport node that implements or associates with the problematic LNE and the master manager and controller of the LNE.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
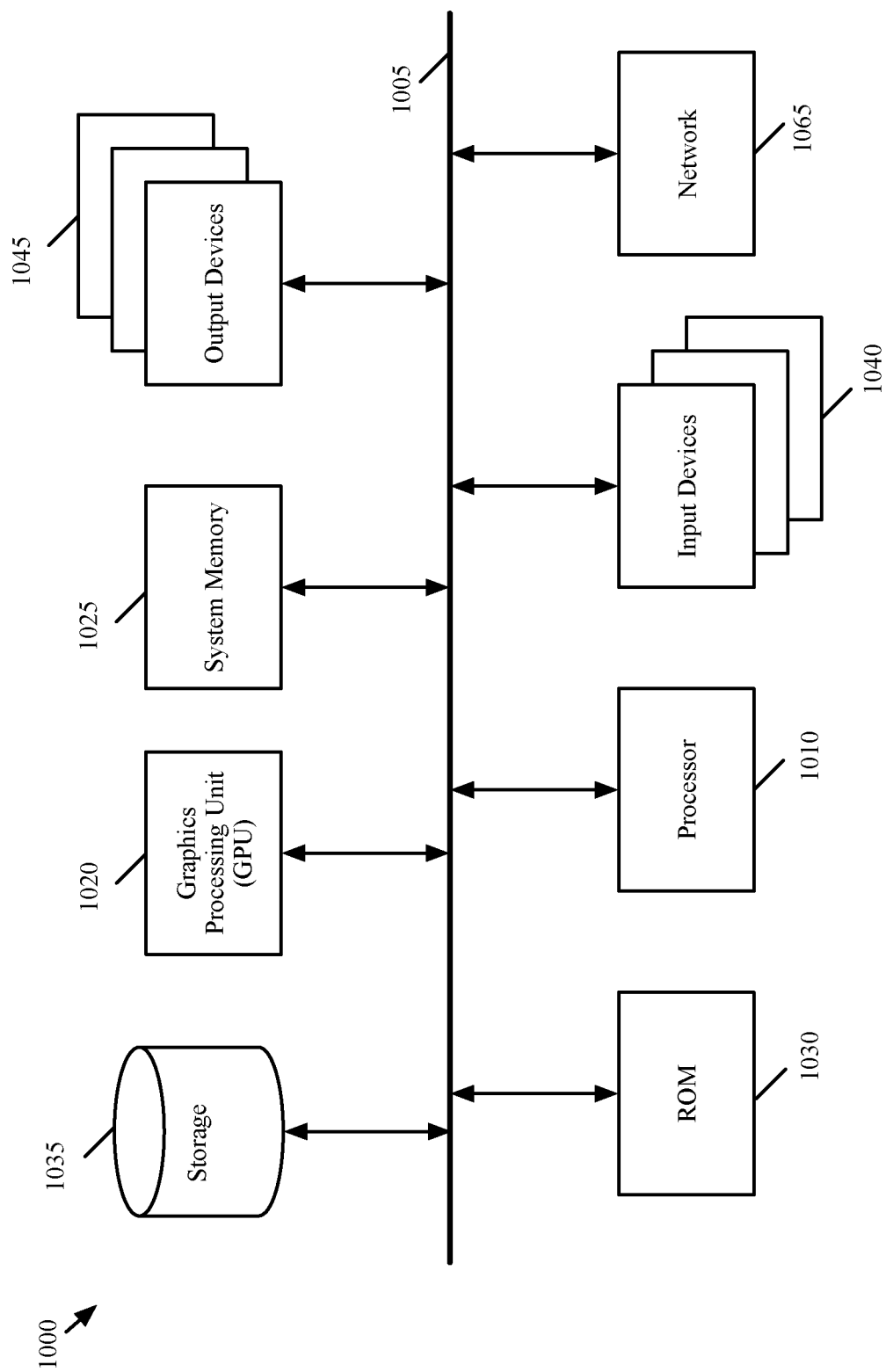
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding drive) as the permanent storage device. Like the permanent storage device 1035, the system memory 1025 is a read-and-write memory device. However, unlike storage device 1035, the system memory 1025 is a volatile read-and-write memory, such a random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a diagnostic tool, a method for diagnosing discrepancies in state data of a logical forwarding element (LFE) that logically connects a plurality of data compute nodes (DCNs) to each other, the method comprising:
   identifying a managed forwarding element (MFE) that couples to at least a first DCN and implements the LFE with a plurality of other MFEs to forward data messages associated with the plurality of DCNs logically connected by the LFE;
   receiving a first state of the LFE from a controller of the identified MFE;
   comparing the first state of the LFE with a second state of the LFE received from a master manager of the LFE, said manager distributing configuration data to the controller for defining the LFE; and
   when the first state of the LFE and the second state of the LFE do not match, generating and transmitting from the diagnostic tool a report regarding a discrepancy between the first and second states, in order to ensure that the data messages associated with the plurality of DCNs logically connected by the LFE are correctly forwarded by the LFE.

2. The method of claim 1, wherein the identified MFE is a first MFE, wherein the first DCN is a source DCN that forwards data messages through the LFE to a destination DCN coupled to a second MFE that implements a second LFE and receiving the data messages through the second LFE.

3. The method of claim 2, wherein the identified first MFE is the same as the second MFE.

4. The method of claim 2, wherein the controller is a first controller, the method further comprising:
   identifying the second MFE that couples to at least one DCN and implements the second LFE;
   receiving a third state of the second LFE from a second controller of the second MFE;
   comparing the third state of the second LFE with a fourth state of the second LFE received from the master manager, said manager distributing configuration data to the second controller for defining the second LFE; and
   when the third state of the second LFE and the fourth state of the second LFE do not match, generating and transmitting from the diagnostic tool a report regarding a discrepancy between the third and fourth states of the second LFE.

5. The method of claim 4, wherein a path between the source DCN and destination DCN is a logical path, wherein the diagnostic tool bidirectionally compares (i) a fifth state of a particular LFE on the logical path received from a particular controller of a particular MFE implementing the particular LFE with (ii) a sixth state from the master manager to report discrepancies between the fifth and sixth states corresponding to the particular LFE on the logical path.

6. The method of claim 5, wherein each MFE of the plurality of MFEs performs forwarding processing on a physical node of a network infrastructure for each LFE implemented by the MFE.

7. The method of claim 2 further comprising identifying logical ports of the LFE that connect to (i) the source DCN and (ii) the second LFE based on at least the desired state of the LFE.

8. The method of claim 7, wherein the first MFE and the second MFE implement tunnel endpoints used for connecting the first MFE and the second MFE by a tunnel.

9. The method of claim 1, wherein the first state of the LFE is a realized state and a second state of the LFE is a desired state of the LFE, wherein the first state comprises runtime data related to the LFE and the second state comprises configuration data related to the LFE.

10. The method of claim 9 further comprising receiving a third logical state after a logical router has been added to the LFE, wherein the LFE is a logical switch and the third logical state is the updated realized state of the LFE.

11. A non-transitory machine readable medium storing a diagnostic tool, which when executed by at least one processing unit diagnoses discrepancies in state data of a logical forwarding element (LFE) that logically connects a plurality of data compute nodes (DCNs) to each other, the diagnostic tool comprising sets of instructions for:
    identifying a managed forwarding element (MFE) that couples to at least a first DCN and implements the LFE with a plurality of other MFEs to forward data messages associated with the plurality of DCNs logically connected by the LFE;
    receiving a first state of the LFE from a controller of the identified MFE;
    comparing the first state of the LFE with a second state of the LFE received from a master manager of the LFE, said manager distributing configuration data to the controller for defining the LFE; and
    when the first state of the LFE and the second state of the LFE do not match, generating and transmitting from the diagnostic tool a report regarding a discrepancy between the first and second states, in order to ensure that the data messages associated with the plurality of DCNs logically connected by the LFE are correctly forwarded by the LFE.

12. The non-transitory machine readable medium of claim 11, wherein the identified MFE is a first MFE, wherein the first DCN is a source DCN that forwards data messages through the LFE to a destination DCN coupled to a second MFE that implements a second LFE and receiving the data messages through the second LFE.

13. The non-transitory machine readable medium of claim 12, wherein the identified first MFE is the same as the second MFE.

14. The non-transitory machine readable medium of claim 12, wherein the controller is a first controller, the diagnostic tool further comprising sets of instructions for:
    identifying the second MFE that couples to at least one DCN and implements the second LFE;
    receiving a third state of the second LFE from a second controller of the second MFE;
    comparing the third state of the second LFE with a fourth state of the second LFE received from the master manager, said manager distributing configuration data to the second controller for defining the second LFE; and
    when the third state of the second LFE and the fourth state of the second LFE do not match, generating and transmitting from the diagnostic tool a report regarding a discrepancy between the third and fourth states of the second LFE.

15. The non-transitory machine readable medium of claim 14, wherein a path between the source DCN and destination DCN is a logical path, wherein the diagnostic tool further comprises a set of instructions for bidirectionally comparing (i) a fifth state of a particular LFE on the logical path received from a particular controller of a particular MFE implementing the particular LFE with (ii) a sixth state from the master manager to report discrepancies between the fifth and sixth states corresponding to the particular LFE on the logical path.

16. The non-transitory machine readable medium of claim 15, wherein each MFE of the plurality of MFEs performs forwarding processing on a physical node of a network infrastructure for each LFE implemented by the MFE.

17. The non-transitory machine readable medium of claim 12, the diagnostic tool further comprising a set of instructions for identifying logical ports of the LFE that connect to (i) the source DCN and (ii) the second LFE based on at least the desired state of the LFE.

18. The non-transitory machine readable medium of claim 17, wherein the first MFE and the second MFE implement tunnel endpoints used for connecting the first MFE and the second MFE by a tunnel.

19. The non-transitory machine readable medium of claim 11, wherein the first state of the LFE is a realized state and a second state of the LFE is a desired state of the LFE, wherein the first state comprises runtime data related to the LFE and the second state comprise configuration data related to the LFE.

20. The non-transitory machine readable medium of claim 19, the diagnostic tool further comprising a set of instructions for receiving a third logical state after a logical router has been added to the LFE, wherein the LFE is a logical switch and the third logical state is the updated realized state of the LFE.

* * * * *